(12) United States Patent
Onno et al.

(10) Patent No.: US 9,521,412 B2
(45) Date of Patent: Dec. 13, 2016

(54) METHOD AND DEVICE FOR DETERMINING RESIDUAL DATA FOR ENCODING OR DECODING AT LEAST PART OF AN IMAGE

(71) Applicant: CANON KABUSHIKI KAISHA, Tokyo (JP)

(72) Inventors: Patrice Onno, Rennes (FR); Edouard Francois, Bourg des Comptes (FR); Christophe Gisquet, Rennes (FR); Guillaume Laroche, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 14/134,362

(22) Filed: Dec. 19, 2013

(65) Prior Publication Data

US 2014/0177721 A1    Jun. 26, 2014

(30) Foreign Application Priority Data

Dec. 21, 2012    (GB) .................................. 1223315.1

(51) Int. Cl.

| H04N 19/00 | (2014.01) |
| H04N 19/117 | (2014.01) |
| H04N 19/105 | (2014.01) |
| H04N 19/139 | (2014.01) |
| H04N 19/33 | (2014.01) |
| H04N 19/86 | (2014.01) |

(52) U.S. Cl.
CPC ...... *H04N 19/00909* (2013.01); *H04N 19/105* (2014.11); *H04N 19/117* (2014.11); *H04N 19/139* (2014.11); *H04N 19/33* (2014.11); *H04N 19/86* (2014.11)

(58) Field of Classification Search
None
See application file for complete search history.

(56) References Cited

U.S. PATENT DOCUMENTS

2006/0012719 A1*  1/2006  Karczewicz ......... H04N 19/187
                                              348/699
2006/0083308 A1*  4/2006  Schwarz ............ H04N 19/0003
                                              375/240.16

(Continued)

FOREIGN PATENT DOCUMENTS

WO    2006110013 A1    10/2006
WO    2008/056959 A1    5/2008

OTHER PUBLICATIONS

GB OA dated May 27, 2015 for Application No. GB1223315.1, pp. 1-3.

*Primary Examiner* — Reza Aghevli
(74) *Attorney, Agent, or Firm* — Canon USA, Inc. I.P. Division

(57) ABSTRACT

A method and device for determining residual data for encoding at least part of an image of an enhancement layer of video data, the video data including the enhancement layer and a base layer, the enhancement layer being composed of processing blocks and the base layer being composed of elementary units each having associated residual data, the method comprising for a processing block of the enhancement layer determining, based on at least the number of elementary units of the base layer spatially corresponding, at least partially, to the processing block, whether or not to use residual data of one or more of said spatially corresponding elementary units of the base layer for prediction of the processing block.

16 Claims, 17 Drawing Sheets

(56) References Cited

U.S. PATENT DOCUMENTS

| | | | |
|---|---|---|---|
| 2006/0222067 A1* | 10/2006 | Park | H04N 19/105 375/240.08 |
| 2006/0233254 A1* | 10/2006 | Lee | H04N 19/70 375/240.16 |
| 2007/0091997 A1* | 4/2007 | Fogg | H04N 19/56 375/240.1 |
| 2007/0189385 A1* | 8/2007 | Park | H04N 19/46 375/240.12 |
| 2009/0060034 A1* | 3/2009 | Park | H04N 19/0003 375/240.12 |
| 2009/0189382 A1* | 7/2009 | Nubel | A01D 75/002 280/789 |
| 2011/0243231 A1* | 10/2011 | Li | H04N 19/00672 375/240.16 |
| 2013/0251030 A1* | 9/2013 | Wang | H04N 19/00424 375/240.03 |

* cited by examiner

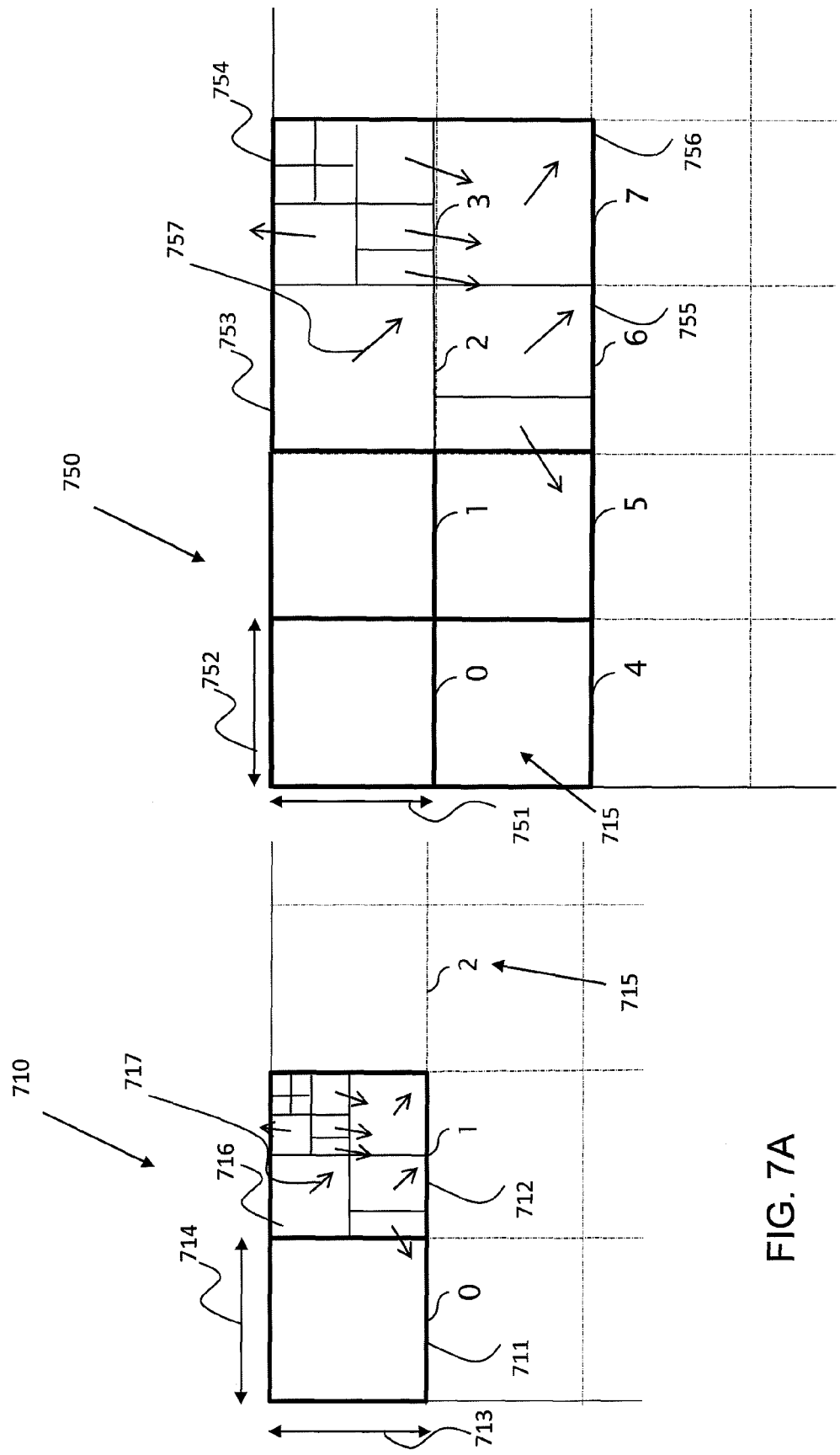

METHOD AND DEVICE FOR DETERMINING RESIDUAL DATA FOR ENCODING OR DECODING AT LEAST PART OF AN IMAGE

This application claims the benefit under 35 U.S.C. §119 (a)-(d) of United Kingdom Patent Application No. 1223315.1, filed on Dec. 21, 2012 and entitled "Method and device for determining residual data for encoding or decoding at least part of an image". The above cited patent application is incorporated herein by reference in its entirety.

FIELD OF THE INVENTION

The present invention concerns a method and a device for determining residual data for encoding or decoding at least part of an image. The present invention further concerns a method and a device for encoding at least part of an image and a method and device for decoding at least part of an image. In embodiments of the invention the image is composed of blocks of pixels and is part of a digital video sequence.

Embodiments of the invention relate to the field of scalable video coding, in particular to scalable video coding applicable to the High Efficiency Video Coding (HEVC) standard.

BACKGROUND OF THE INVENTION

Video data is typically composed of a series of still images which are shown rapidly in succession as a video sequence to give the idea of a moving image. Video applications are continuously moving towards higher and higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended color gamut). This technological evolution puts higher pressure on the distribution networks that are already facing difficulties in bringing HDTV resolution and high data rates economically to the end user.

Video coding is a way of transforming a series of video images into a compact bitstream so that the capacities required for transmitting and storing the video images can be reduced. Video coding techniques typically use spatial and temporal redundancies of images in order to generate data bit streams of reduced size compared with the original video sequences. Spatial prediction techniques (also referred to as Intra coding) exploit the mutual correlation between neighbouring image pixels, while temporal prediction techniques (also referred to as INTER coding) exploit the correlation between images of sequential images. Such compression techniques render the transmission and/or storage of the video sequences more effective since they reduce the capacity required of a transfer network, or storage device, to transmit or store the bit-stream code.

An original video sequence to be encoded or decoded generally comprises a succession of digital images which may be represented by one or more matrices, the coefficients of which represent pixels. An encoding device is used to code the video images, with an associated decoding device being available to reconstruct the bit stream for display and viewing.

Common standardized approaches have been adopted for the format and method of the coding process. One of the more recent standards is Scalable Video Coding (SVC) in which a video image is split into smaller sections (often referred to as macroblocks or blocks) and treated as being comprised of hierarchical layers. The hierarchical layers include a base layer, corresponding to lower quality images (or frames) of the original video sequence, and one or more enhancement layers (also known as refinement layers) providing better quality, images in terms of spatial and/or temporal enhancement compared to base layer images. SVC is a scalable extension of the H.264/AVC video compression standard. In SVC, compression efficiency can be obtained by exploiting the redundancy between the base layer and the enhancement layers.

A further video standard being standardized is HEVC, in which the macroblocks are replaced by so-called Coding Units and are partitioned and adjusted according to the characteristics of the original image segment under consideration. This allows more detailed coding of areas of the video image which contain relatively more information and less coding effort for those areas with fewer features.

The video images may be processed by coding each smaller image portion individually, in a manner resembling the digital coding of still images or pictures. Different coding models provide prediction of an image portion in one frame, from a neighboring image portion of that frame, by association with a similar portion in a neighboring frame, or from a lower layer to an upper layer (referred to as "inter-layer prediction"). This allows use of already available coded information, thereby reducing the amount of coding bit-rate needed overall.

Differences between the source area and the area used for prediction are captured in a set of residual values which themselves are encoded in association with a code for the source area. Effective coding selects the best model to provide the desired image quality at decoding, while taking account of the bitstream size required by each model to represent an image in the bitstream. A trade-off between the decoded image quality and reduction in required number of bits or bit rate, also known as compression of the data, is typically considered.

In general, the more data that can be compressed at a given visual quality, the better the performance in terms of compression efficiency.

SUMMARY OF THE INVENTION

The present invention has been devised to address one or more of the foregoing concerns.

According to a first aspect of the invention there is provided a method of determining residual data for encoding at least part of an image of an enhancement layer of video data, the video data including the enhancement layer and a base layer, the enhancement layer being composed of processing blocks and the base layer being composed of elementary units each having associated residual data, the method comprising for a processing block of the enhancement layer determining, based on at least the number of elementary units of the base layer spatially corresponding, at least partially, to the processing block, whether or not to use residual data of one or more of said spatially corresponding elementary units of the base layer for prediction of the processing block.

By determining whether or not residual data of the base layer is suitable for use in predicting a processing block of the enhancement layer, embodiments of the invention help to avoid visual artefacts which may be caused by mismatching of motion vectors between the base layer and the enhancement layer for example.

An elementary unit of the base layer spatially corresponds to a processing block of the enhancement layer when at least a part of the elementary unit is located in the region of the base layer which spatially corresponds to the entire processing block. In one case the said region of the base layer may be fully located within one elementary unit of the base layer and thus the processing block is considered to spatially correspond to one elementary unit. In another case a plurality of elementary units may be at least partially located in the region of the base layer spatially corresponding to the processing block and thus the processing block is considered to spatially correspond to a plurality of elementary units.

The base layer may for example have a lower spatial or temporal resolution compared to the enhancement layer. The video data may include a plurality of enhancement layers of different spatial or temporal resolution compared to the base layer.

For example, in some embodiments of the invention, in the case where only one elementary unit spatially corresponds to the processing block, the residual data associated with the said one elementary unit is used for prediction of the corresponding processing block of the enhancement layer; otherwise, in the case where a plurality of elementary units spatially correspond at least partially to the processing block, either:

1) the residual data of none of the said plurality of elementary units is used for prediction of the corresponding processing block of the enhancement layer; or 2) the residual data of at least one of the plurality of elementary units is used, under a predefined condition, for prediction of the corresponding processing block of the enhancement layer.

In some embodiments, the predefined condition defines that the motion vectors of the plurality of elementary units are consistent with one another.

For example, the motion vectors of the plurality of elementary units are considered to be consistent with one another if the direction of each of the motion vectors fall within a predetermined angular tolerance. The predetermined angular tolerance may be for example 5%.

In an embodiment, the motion vectors of the plurality of elementary units are considered to be consistent with one another if the magnitude of each of the motion vectors falls within a predetermined range of magnitudes. For example the predetermined range of magnitudes is defined by a tolerance of 10%.

In some embodiments, data representative of the tolerance is transmitted in the bitstream.

In other embodiments, the predefined condition is the application of a filtering process to the residual data of the plurality of elementary units.

In one embodiment, the filtering process is applied to the residual data at the inner borders between the plurality of elementary units. The filtering process may comprise the application of a deblocking filter, for example.

In some embodiments, the filtering strength of the filtering process is determined in dependence upon the difference between the motion vectors of the two elementary units delimited by the respective inner border.

For example, the filtering strength is dependent on the difference in at least one of the angular directions and the magnitudes of the motion vectors.

In other embodiments, the predefined condition is the application of only partial residual data for prediction of the processing block.

For example, the partial residual data may correspond to the reconstruction of the low frequency component of the inverse DCT such that the residual data corresponding to the edges (high frequencies) is not taken into account.

In one embodiment, only the DC coefficients of the residual data are used for prediction of the processing block.

In some embodiments, the state of predetermined flag signalled in the bitstream is indicative of whether one or more elementary units spatially correspond to the processing block. For example, the predetermined flag is a base_mode_flag in H264/SVC. In another example the predetermined flag is a dedicated residual prediction flag.

According to a second aspect of the invention there is provided a device for determining residual data for encoding or decoding at least part of an image of an enhancement layer of video data, the video data including the enhancement layer and a base layer, the enhancement layer being composed of processing blocks and the base layer being composed of elementary units each having associated residual data, the device comprising a residual data processor for determining, based on at least the number of elementary units of the base layer spatially corresponding, at least partially, to a processing block of the enhancement layer, whether or not to use residual data of one or more of said spatially corresponding elementary units of the base layer for prediction of the processing block.

In an embodiment, the residual data processor is configured to determine in the case where only one elementary unit spatially corresponds to the processing block, the residual data associated with the said one elementary unit is to be used for prediction of the corresponding processing block of the enhancement layer;

otherwise, in the case where a plurality of elementary units spatially correspond at least partially to the processing block, either:

1) the residual data of none of the said plurality of elementary units is to be used for prediction of the corresponding processing block of the enhancement layer; or 2) the residual data of at least one of the plurality of elementary units is to be used, under a predefined condition, for prediction of the corresponding processing block of the enhancement layer.

In an embodiment, the predefined condition defines that the motion vectors of the plurality of elementary units are consistent with one another.

In an embodiment, the residual data processor is configured to consider motion vectors of the plurality of elementary units to be consistent with one another if the direction of each of the motion vectors fall within a predetermined angular tolerance.

In an embodiment, the predetermined angular tolerance is 5%.

In an embodiment, the residual data processor is configured to consider the motion vectors of the plurality of elementary units to be consistent with one another if the magnitude of each of the motion vectors falls within a predetermined range of magnitudes.

In an embodiment, the predetermined range of magnitudes is defined by a tolerance of 10%.

In an embodiment, a transceiver is provided for transmitting or receiving data representative of the tolerance in the bitstream.

In an embodiment, the predefined condition is the application of a filtering process to the residual data of the plurality of elementary units the device further comprising a filter module for applying the filtering process In an embodiment, the filter is configured to apply the filtering process to the residual data at the inner borders between the plurality of elementary units.

In an embodiment, the filter is configured to apply a deblocking filter.

In an embodiment, the filtering strength applied by the filter is determined in dependence upon the difference between the motion vectors of the two elementary units delimited by the respective inner border.

In an embodiment, the filtering strength is dependent on the difference in at least one of the angular directions and the magnitudes of the motion vectors.

In an embodiment, the predefined condition is the application of only partial residual data for prediction of the processing block, the residual data processing being configured to apply said partial residual data.

In an embodiment, the partial residual data corresponds to the reconstruction of the low frequency component of the inverse DCT such that the residual data from the edges is not taken into account.

In an embodiment, only the DC coefficients of the residual data are used for prediction of the processing block.

In an embodiment, the state of predetermined flag signalled in the bitstream is indicative of whether one or more elementary units spatially correspond to the processing block.

In an embodiment, the predetermined flag is a base_mode_flag in H264/SVC.

In another embodiment, the predetermined flag is a dedicated residual prediction flag.

A further aspect of the invention relates to an encoding device for encoding at least part of an image of an enhancement layer of video data comprising: a a device for determining residual data for encoding the said least part of the image of an enhancement layer of video data in accordance with the device according to any of the embodiments of the second aspect of the invention; and an encoder for encoding the said at least part of the image A yet further aspect of the invention relates to a decoding device for decoding at least part of an image of an enhancement layer of video data comprising: a a device for determining residual data for decoding the said least part of the image of an enhancement layer of video data in accordance with the device according to any of the embodiments of the second aspect of the invention; and a decoder for the said at least part of the image At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 7A and 7B schematically illustrate coding units of a base layer and an enhancement layer for a spatial up-sampling ratio of 2;

DETAILED DESCRIPTION OF EMBODIMENTS OF THE INVENTION

Figure 1A:
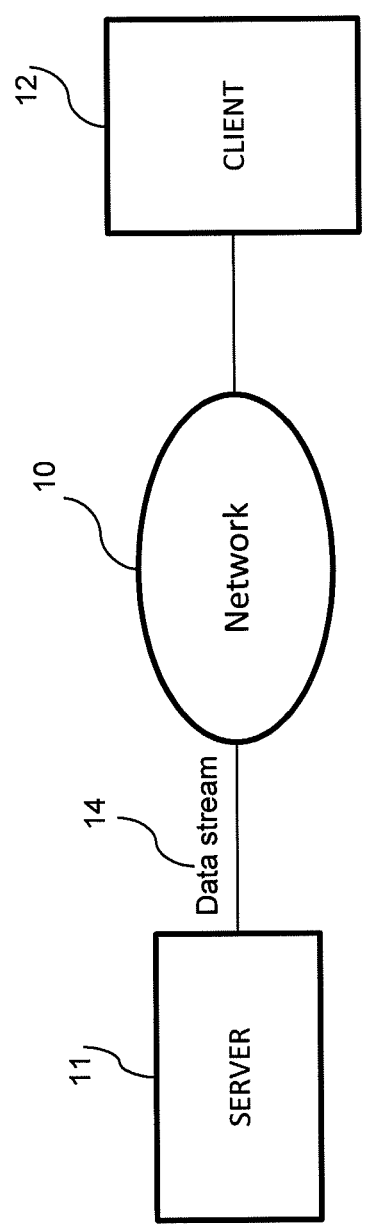
FIG. 1A schematically illustrates a data communication system in which one or more embodiments of the invention may be implemented.

FIG. 1A illustrates a data communication system in which one or more embodiments of the invention may be implemented. The data communication system comprises a sending device, in this case a server 11, which is operable to transmit data packets of a data stream 14 to a receiving device, in this case a client terminal 12, via a data communication network 10. The data communication network 10 may be a Wide Area Network (WAN) or a Local Area Network (LAN). Such a network may be for example a wireless network (Wifi/802.11 a or b or g or n), an Ethernet network, an Internet network or a mixed network composed of several different networks. In a particular embodiment of the invention the data communication system may be, for example, a digital television broadcast system in which the server 11 sends the same data content to multiple clients.

The data stream 14 provided by the server 11 may be composed of multimedia data representing video and audio data. Audio and video data streams may, in some embodiments, be captured by the server 11 using a microphone and a camera respectively. In some embodiments data streams may be stored on the server 11 or received by the server 11 from another data provider. The video and audio streams are coded by an encoder of the server 11 in particular for them to be compressed for transmission.

In order to obtain a better ratio of the quality of transmitted data to quantity of transmitted data, the compression of the video data may be of motion compensation type, for example in accordance with the HEVC type format or H.264/SVC type format.

A decoder of the client 12 decodes the reconstructed data stream received by the network 10. The reconstructed images may be displayed by a display device and received audio data may be reproduced by a loud speaker.

Figure 1B:
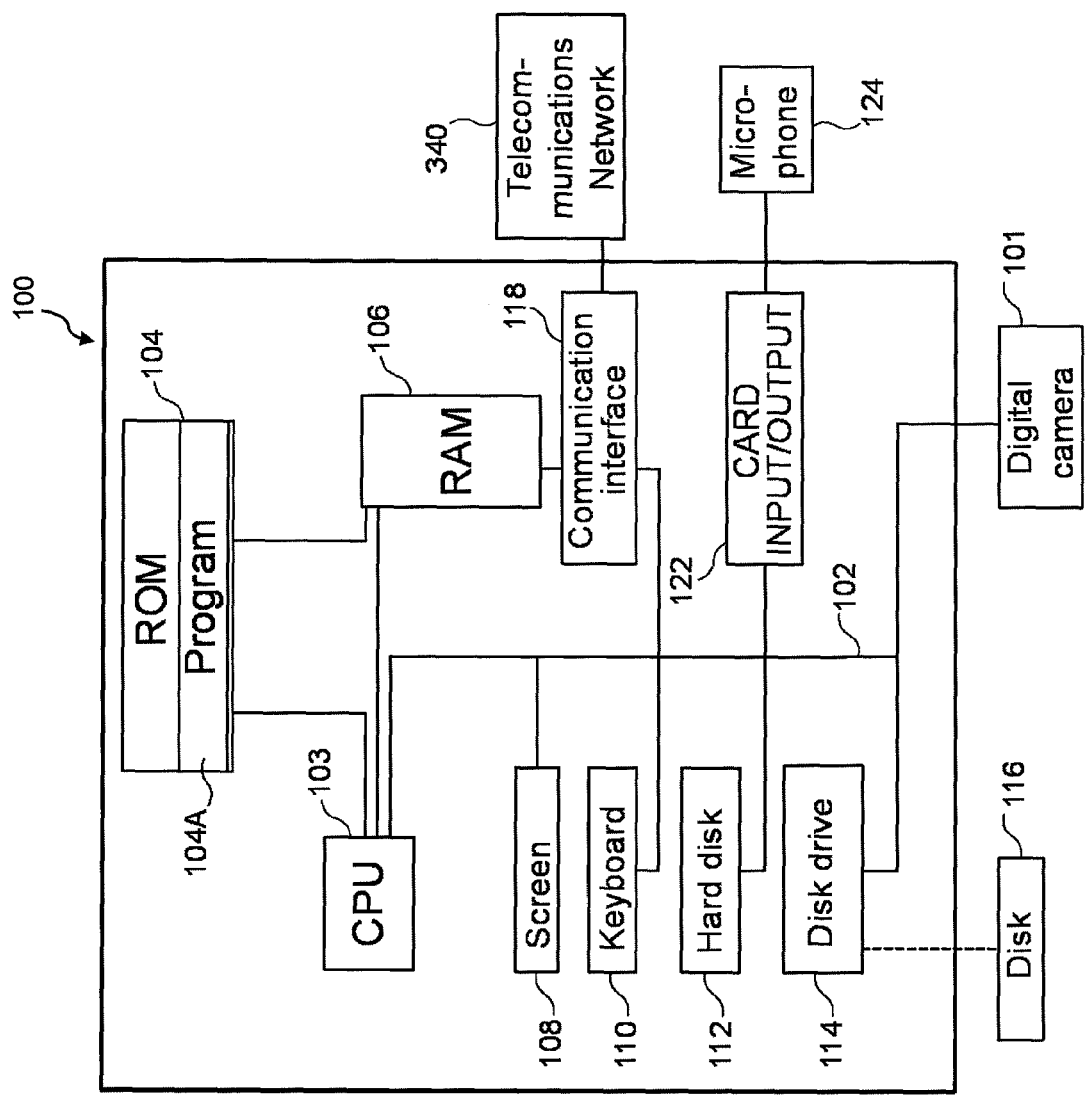
FIG. 1B is a schematic block diagram illustrating a processing device configured to implement at least one embodiment of the present invention.

FIG. 1B schematically illustrates an example of a device 100, in which one or more embodiments of the invention may be implemented. The exemplary device as illustrated is arranged in cooperation with a digital camera 101, a microphone 124 connected to a card input/output 122, a telecommunications network 340 and a disk 116. The device 100 includes a communication bus 102 to which are connected:

a central processing CPU 103 provided, for example in the form of a microprocessor a read only memory (ROM) 104 comprising a computer program 104A whose execution enables methods according to one or more embodiments of the invention to be performed. This memory 104 may be a flash memory or EEPROM, for example;

a random access memory (RAM) 106 which, after powering up of the device 100, contains the executable code of the program 104A necessary for the implementation of one or more embodiments of the invention. The memory 106, being of a random access type, provides more rapid access compared to ROM 104. In addition the RAM 106 may be operable to store images and blocks of pixels as processing of images of the video sequences is carried out on the video sequences (transform, quantization, storage of reference images etc.);

a screen 108 for displaying data, in particular video and/or serving as a graphical interface with the user, who may thus interact with the programs according to embodiments of the invention, using a keyboard 110 or any other means e.g. a mouse (not shown) or pointing device (not shown);

a hard disk 112 or a storage memory, such as a memory of compact flash type, able to contain the programs of embodiments of the invention as well as data used or produced on implementation of the invention;

an optional disc drive 114, or another reader for a removable data carrier, adapted to receive a disc 116 and to read/write thereon data processed, or to be processed, in accordance with embodiments of the invention and;

a communication interface 118 connected to a telecommunications network 340 connection to a digital camera 101; It will be appreciated that in some embodiments of the invention the digital camera and the microphone may be integrated into the device 100 itself. Provision of a digital camera and a microphone is optional.

The communication bus 102 permits communication and interoperability between the different elements included in the device 100 or connected to it. The representation of the communication bus 102 given here is not limiting. In particular, the CPU 103 may communicate instructions to any element of the device 100 directly or by means of another element of the device 100.

The disc 116 can be replaced by any information carrier such as a compact disc (CD-ROM), either writable or rewritable, a ZIP disc, a memory card or a USB key. Generally, an information storage means, which can be read by a micro-computer or microprocessor, which may optionally be integrated in the device 100 for processing a video sequence, is adapted to store one or more programs whose execution permits the implementation of the method according to the invention.

The executable code enabling a coding device to implement one or more embodiments of the invention may be stored in ROM 104, on the hard disc 112 or on a removable digital medium such as a disc 116.

The CPU 103 controls and directs the execution of the instructions or portions of software code of the program or programs of embodiments of the invention, the instructions or portions of software code being stored in one of the aforementioned storage means. On powering up of the device 100, the program or programs stored in non-volatile memory, e.g. hard disc 112 or ROM 104, are transferred into the RAM 106, which then contains the executable code of the program or programs of embodiments of the invention, as well as registers for storing the variables and parameters necessary for implementation of embodiments of the invention.

It may be noted that the device implementing one or more embodiments of the invention, or incorporating it, may be implemented in the form of a programmed apparatus. For example, such a device may then contain the code of the computer program or programs in a fixed form in an application specific integrated circuit (ASIC).

The exemplary device 100 described here and, particularly, the CPU 103, may implement all or part of the processing operations as described in what follows.

Figure 2:
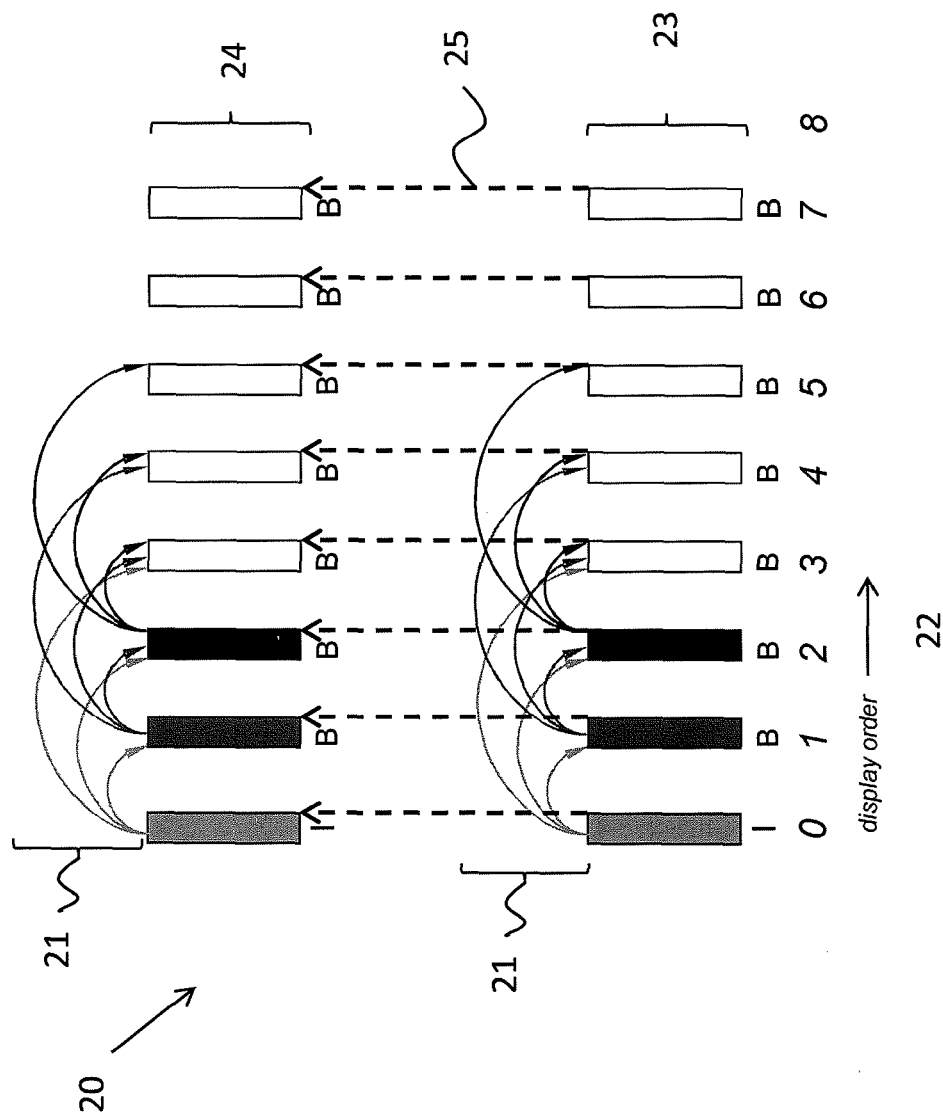
FIG. 2 schematically illustrates an example of a low-delay temporal coding structure.

FIG. 2 schematically illustrates an example of a low-delay temporal coding structure 20. In this configuration, an input image frame is predicted from several already coded frames. Forward temporal prediction, as indicated by arrows 21, ensures the low delay property. The low delay property means that on the decoder side, the decoder is able to display a decoded image straight away once this image is in a decoded format, as represented by arrow 22. The input video sequence is shown as being comprised of a base layer 23 and an enhancement layer 24. Each layer is composed of a first image frame I and subsequent image frames B.

In addition to temporal prediction, inter-layer prediction between the base layer 23 and enhancement layer 24 is also illustrated in FIG. 2 and referenced by arrows, including arrow 25. Scalable video coding of the enhancement layer 24 aims to exploit the redundancy that exists between the coded base layer 23 and the enhancement layer 24, in order to provide good coding efficiency in the enhancement layer 24.

In particular, the motion information contained in the base layer can be advantageously used in order to predict motion information in the enhancement layer. In this way, the efficiency of the predictive motion vector coding in the enhancement layer can be improved, compared to non-scalable motion vector coding, as specified in the HEVC video compression system for instance. More generally, inter-layer prediction of the prediction information, which includes motion information, based on the prediction information contained in the coded base layer can be used to efficiently encode an enhancement layer, on top of the base layer.

In the case of spatial scalability, for example, inter-layer prediction implies that prediction information taken from the base layer should undergo spatial up-sampling. Embodiments of the present invention provide a method to efficiently up-sample HEVC prediction information, in particular in the case of non-dyadic spatial scalability. This case will be explained more in detail in what follows.

Figure 3:
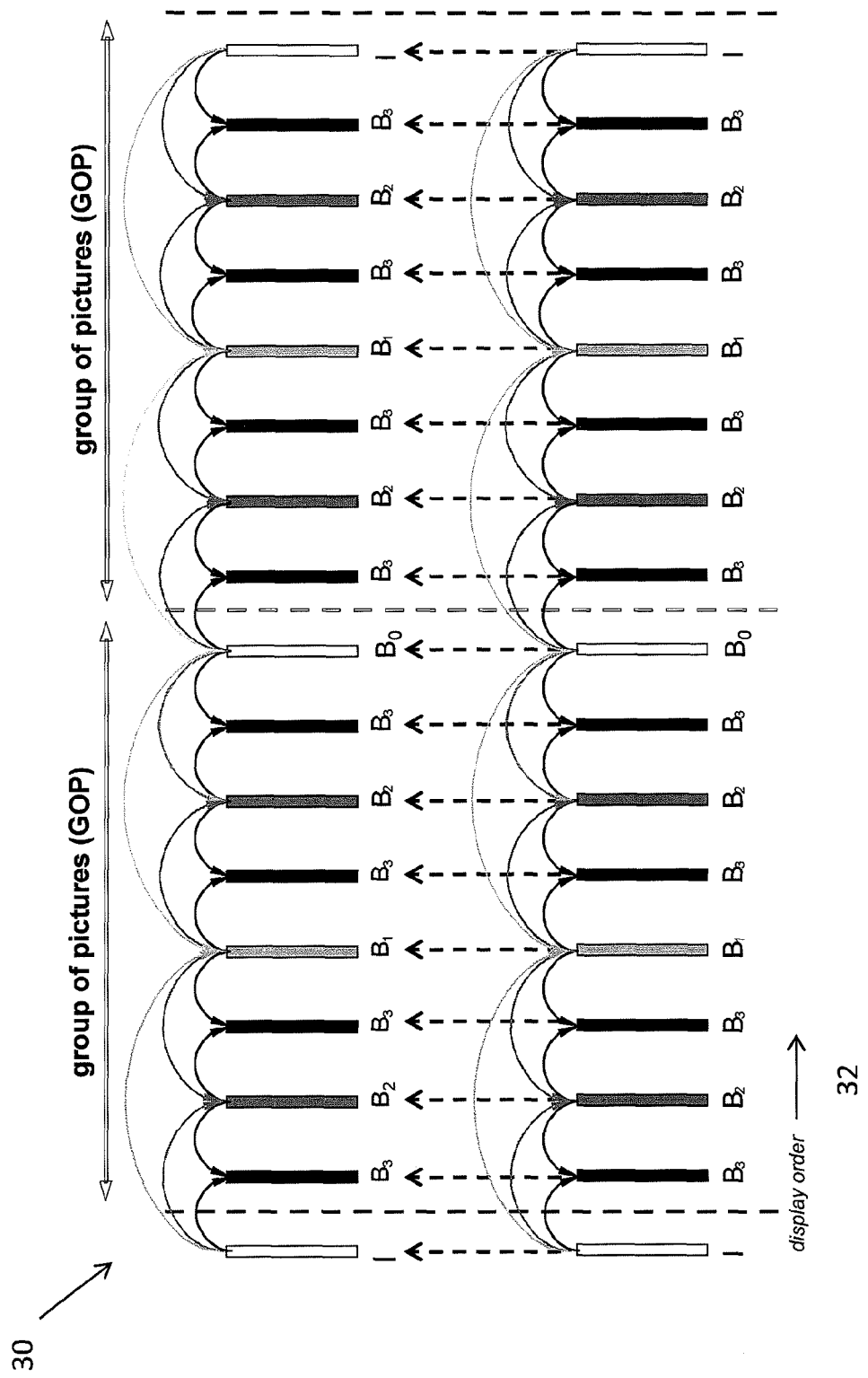
FIG. 3 schematically illustrates an example of a random access structure.

FIG. 3 schematically illustrates a random access temporal coding structure employed in one or more embodiments of the invention. The input sequence is broken down into groups of images (pictures) GOP in a base layer and an enhancement layer. A random access property signifies that several access points are enabled in the compressed video stream, i.e. the decoder can start decoding the sequence at any image in the sequence which is not necessarily the first image in the sequence. This takes the form of periodic INTRA image coding in the stream as illustrated by FIG. 3.

In addition to INTRA images, the random access coding structure enables INTER prediction, both forward and backward (in relation to the display order as represented by arrow 32) predictions can be effected. This is achieved by the use of B images, as illustrated. The random access configuration also provides temporal scalability features, which takes the form of the hierarchical organization of B images, B0 to B3 as illustrated in the figure.

It can be seen that the temporal codec structure used in the enhancement layer is identical to that of the base layer corresponding to the Random Access HEVC testing conditions so far employed.

In the proposed scalable HEVC codec, according to at least one embodiment of the invention, INTRA enhancement images are coded. In particular, this involves up-sampling of the base image and the texture coding/decoding process.

Figure 4:
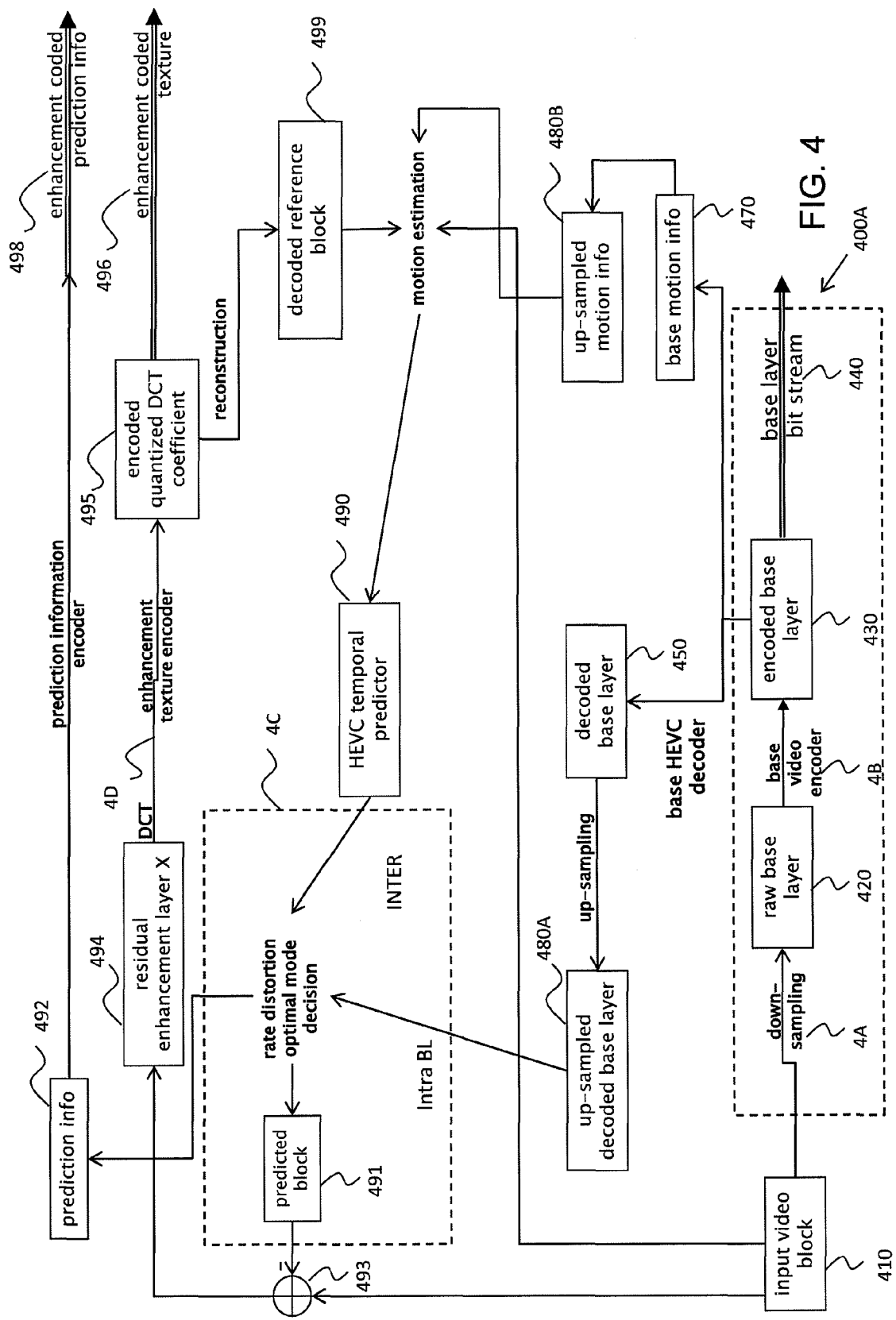
FIG. 4 is a block diagram illustrating the modules of a scalable encoder in accordance with an embodiment of the invention.

FIG. 4 schematically illustrates an exemplary encoder architecture 400, which includes a spatial up-sampling step applied to prediction information of the base layer, as proposed by one or more embodiments of the invention. The diagram of FIG. 4 illustrates the base layer coding, and the enhancement layer coding process for a given image of scalable video data.

The first stage of the process corresponds to the processing of the base layer, and is illustrated on the bottom part 400A of FIG. 4.

First, the input image to be coded 410 is down-sampled 4A to the spatial resolution of the base layer, providing a raw base layer 420. It is then encoded 4B in an HEVC compliant way, which leads to the "encoded base layer" 430 and associated base layer bitstream 440. In the next step, information is extracted from the coded base layer that may be used afterwards in the inter-layer prediction of the enhancement image. The extracted information includes.

the reconstructed (decoded) base image 450 which is later used for inter-layer texture prediction.

the base prediction/motion information 470 of the base image which is used in several inter-layer prediction tools in the enhancement image. This information comprises, for example, coding unit information, prediction unit partitioning information, prediction modes, motion vectors, reference image indices, etc.

Once this information has been extracted from the coded base image, it undergoes an up-sampling process, which aims at adapting the information to the spatial resolution of the enhancement layer. The up-sampling of the extracted base information is performed as described below, for the three types of data listed above.

The reconstructed base image 450, is up-sampled to the spatial resolution of the enhancement layer 480A. An interpolation filter corresponding to the DCTIF 8-tap filter (or any other interpolation filter) used for motion compensation in HEVC is employed.

It is also through this step 450 that the residual data from the base layer is used to predict the block of the enhancement layer.

The base prediction/motion information 470 is transformed (upscaled), so as to obtain a coding unit representation that is adapted to the spatial resolution of the enhancement layer 480B. The prediction information up-sampling mechanism will be described in more details with reference to FIGS. 7A, 7B and 8B.

Once the information extracted from the base layer is available in its up-sampled form, the encoder is then ready to predict the enhancement image 4C. The prediction process used in the enhancement layer is executed in an identical way on the encoder side and on the decoder side.

The prediction process involves selecting the enhancement image organization in a rate distortion optimal way in terms of coding unit (CU) representation, prediction unit (PU) partitioning and prediction mode selection. These concepts of CU, PU will be further defined below with reference to FIG. 5, and are also part of the HEVC standard.

Several inter layer prediction modes are possible for a given Coding Unit of the enhancement layer and these are evaluated based on a rate distortion criterion. The following sections give examples of the prediction modes which correspond to the main interlayer prediction modes commonly used. It will be appreciated that any other alternatives or improvements of these prediction modes are possible.

Main inter-layer coding modes in the pixel domain include

An "Intra Base Layer" mode (Intra_BL) involving predicting a current block of the enhancement layer by applying an up-sampling of the collocated reconstructed base layer block. This mode can be summarized by the following relation:

$$PRE_{EL} = UPS\{REC_{BL}\}$$

where $PRE_{EL}$ is the prediction signal for the current CU in the enhancement layer, $UPS\{.\}$ is the up-sampling operator (typically a DCT-IF or a Bilinear filter) and $REC_{BL}$ is the reconstructed signal in the collocated CU in the base layer.

A "GRILP" (Generalized Residual Inter-Layer Prediction) mode which involves performing motion compensation in the enhancement layer and adding a corrective value corresponding to the difference between the up-sampling of the reconstructed base layer block and the up-sampling version of the compensated CU in the base layer using the enhancement motion vector.

$$PRE_{EL} = MC\{REF_{EL}, MV_{EL}\} + UPS\{REC_{BL}\} - MC\{UPS\{REF_{BL}\}, MV_{EL}\}$$

where $MC\{I, MV\}$ corresponds to the motion compensation operator with motion vector MV using the image I as a reference.

A "Base" mode involving predicting the current CU in the enhancement layer by applying motion compensation using the motion information (motion vector, reference list, reference index, . . . ) of the collocated base layer CU. Motion vectors are scaled to match the spatial resolution change. In this mode, the addition of the residual data of the base layer for the prediction is also considered. This mode can be summarized by the following formula:

$$PRE_{EL}=MC\{REF_{EL}, SP\_ratio*MV_{BL}\}+UPS\{RES_{BL}\},$$

where SP_ratio is the spatial ratio between the base layer and the enhancement layer and $RES_{BL}$ is the decoded residual of the corresponding CU in the base layer.

This mode could be also modified to introduce a further step where the predicted CU is smoothed with a deblocking filter (DBF{.}).

$$PRE_{EL}=DBF\{MC\{REF_{EL}, SP\_ratio*MV_{BL}\}+UPS\{RES_{BL}\}\},$$

The second term corresponding to the addition of the residue of the "Base" mode may be computed in a different manner in order to introduce a residual prediction as for the "GRILP" mode. The corresponding relation is then as follows:

$$PRE_{EL}=MC\{REF_{EL}, SP\_ratio*MV_{BL}\}+\{UPS\{REC_{BL}\}+MC\{UPS\{REF_{BL}\}, MV_{EL}\}\}\}$$

Alternatively, different methods can be applied for the prediction mode of the current Coding Unit by using a differential image domain. In such a case, the prediction mode can include the following:

An "Intra Diff" mode $$PRE_{EL}=UPS\{REC_{BL}\}+PRED_{INTRA}\{DIFF_{EL}\}$$

where $PRED_{INTRA}\{.\}$ is the prediction operator and $DIFF_{EL}$ is the differential domain of the current CU.

An "Inter Diff" mode $$PRE_{EL}=UPS\{REC_{BL}\}+MC\{DIFF_{EL}, MV_{EL}\},$$

$$PRE_{EL}=UPS\{REC_{BL}\}+MC\{REF_{EL}-UPS\}REF_{BL}\{, MV_{EL}\}$$

This prediction mode is very close to the GRILP mode since by assuming that the Motion compensation operators can be applied individually on each term of the difference. In that case, we can rewrite it as:

$$PRE_{EL}=UPS\{REC_{BL}\}+MC\{REF_{EL}, MV_{EL}\}-MC\{UPS\{REF_{BL}\}, MV_{EL}\}$$

During the encoding of a particular CU in the enhancement layer all the possible prediction modes for a CU are tested to evaluate the best coding prediction mode regardless of a rate/distortion criterion.

These modes are of two categories:

intra-layer modes which generally correspond to the modes applied in a non-scalable video codec. In HEVC, they correspond to the typical mode "intra", "skip", "merge" and "inter" modes and other possible alternatives.

inter-layer modes which correspond to those as previously presented.

Depending on the result of the encoding process, a coding mode is associated with each CU of the enhancement layer and can be of the two categories mentioned above. This mode is signaled in the bitstream for each CU by using a binary codeword designed so that the most used modes are represented by shorter binary codewords.

Figure 5:
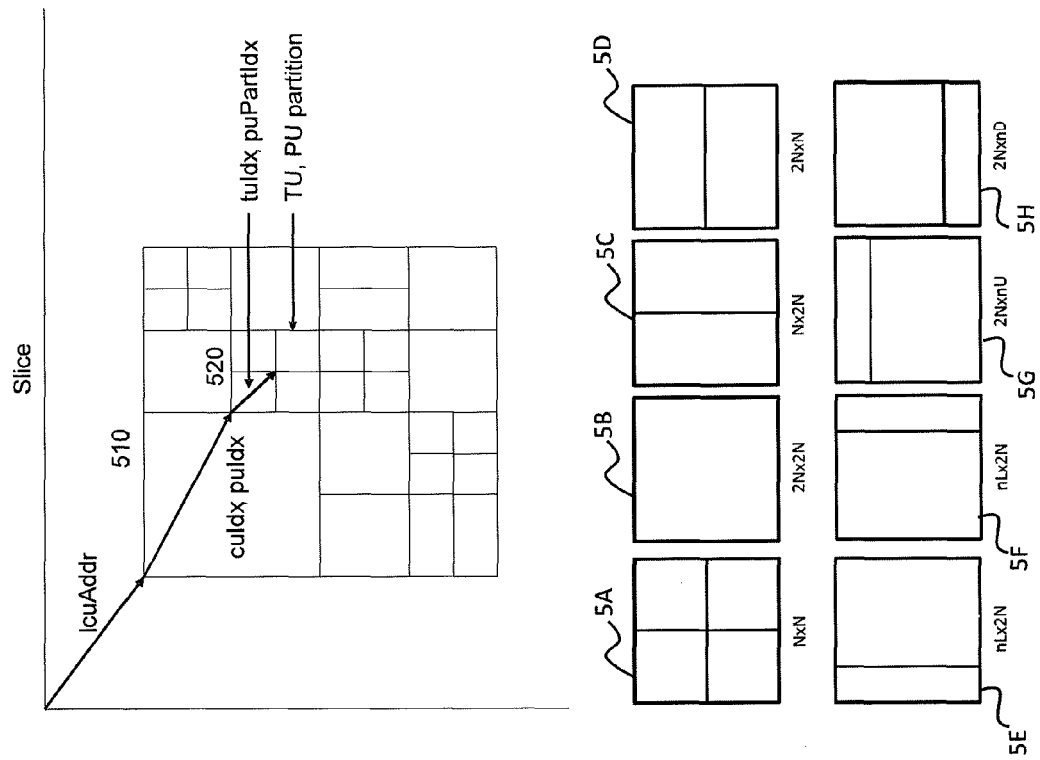
FIG. 5 illustrates examples of partitioning of coding units into prediction units.

Referring again to FIG. 4, the prediction process 4C attempts to construct a whole prediction image 491 of the current enhancement image to be coded. To do so, it determines the best rate distortion trade-off between the quality of that prediction image and the rate cost of the prediction information to be encoded. The output of this prediction process includes the following elements:

a set of coding units with associated size, covering the whole prediction image.

for each coding unit, a partitioning of the coding unit into one or several prediction units. Each prediction unit is selected from among all the prediction unit shapes complying with the HEVC standard, which are illustrated at the bottom of FIG. 5.

for each prediction unit, a prediction mode determined for that prediction unit, together with the prediction parameters associated with that prediction unit.

Therefore, for each candidate coding unit in the enhancement image, the prediction process of FIG. 4 determines the most optimal prediction unit partitioning and prediction unit parameters for that candidate CU.

In particular, for a given partitioning of the CU into prediction unit, the prediction process searches the best prediction type for that prediction unit. In HEVC, each prediction unit is given an INTRA or INTER prediction mode. For each mode, prediction parameters are determined. INTER prediction mode involves a motion compensated temporal prediction of the prediction unit. This uses two lists of past and future reference images depending on the temporal coding structure used (see FIGS. 7A and 7B and FIGS. 8A and 8B). This temporal prediction process as specified by HEVC is re-used here. This corresponds to the prediction mode referred to as "HEVC temporal predictor" 490 on FIG. 4. It may be noted that in the temporal predictor search, the prediction process searches the best one or two (respectively for uni- and bi-directional prediction) reference blocks for predicting a current prediction unit of current image.

INTRA prediction in HEVC involves predicting a prediction unit with the help of neighboring prediction units of the current prediction unit that have already been coded and reconstructed. In addition to the spatial prediction process of HEVC, another INTRA prediction type can be used, called "Intra BL". An Intra BL prediction type involves predicting a prediction unit of the enhancement image with the spatially corresponding block in the up-sampled decoded base image. It may be noted that the "Intra BL" prediction mode tries to exploit the redundancy that exists between the underlying base image and the current enhancement image. It corresponds to so-called inter-layer prediction tools that can be added to the HEVC coding system, in the coding of a scalability layer.

The "rate distortion optimal mode decision" of FIG. 4 results in the following elements.

a set of coding unit representations with associated prediction information for the current image. This is referred to as prediction information 492 in FIG. 4. This information then undergoes a prediction information coding step, which constitutes a part of the coded video bitstream. It may be noted that in this prediction information coding, the inter-layer prediction mode, i.e. Intra BL, is signaled as particular INTRA prediction modes. It may be noted that in another embodiment, the "Intra BL" prediction image of FIG. 4 can be inserted into the list of reference images used in the temporal prediction of current enhancement image; and a block 491, which represents the final prediction image of current enhancement image to be coded. This image is then used to encode the texture data part of current enhancement image.

The next encoding step illustrated in FIG. 4 includes computing the difference 493 between the original block 410 and the obtained prediction block 491. This difference comprises the residual data of the current enhancement image 494, which is then processed by the texture coding process 4D (for example comprising a DCT transform followed by a quantization of the DCT coefficients and entropy coding). This process provides encoded quantized DCT coefficients 495 which comprise enhancement coded texture 496 for output. A further available output is the enhancement coded prediction information 498 generated from the prediction information 492.

Moreover, the encoded quantized DCT coefficients 495 undergo a reconstruction process, and are then stored in a decoded reference block 499. This decoded reference block is used afterwards in the motion estimation information used in the computation of the prediction mode referred to as "HEVC temporal predictor" 490.

FIG. 5 schematically illustrates an example of the configuration of coding units and prediction unit specified in the HEVC standard. An HEVC coded image is composed of a series of coding units. A coding unit of an HEVC image corresponds to a square block of that image, and can have a size in a pixel range of from 8×8 to 64×64. A coding unit having the largest size authorized for the considered image is referred to as a Largest Coding Unit (LCU) 510. For each coding unit of the enhancement image, the encoder decides how to partition it into one or more prediction units (PU) 520. Each prediction unit can have a square or rectangular shape and is given a prediction mode (INTRA or INTER) and some prediction information. With respect to INTRA prediction, the associated prediction parameters include the angular direction used in the spatial prediction of the considered prediction unit, associated with the corresponding spatial residual data. In the case of INTER prediction, the prediction information comprises the reference image indices and the motion vector(s) used to predict the considered prediction unit, and the associated temporal residual texture data. Examples 5A to 5H show some of the possible arrangements of partitioning (or types) which are available.

Figure 6:
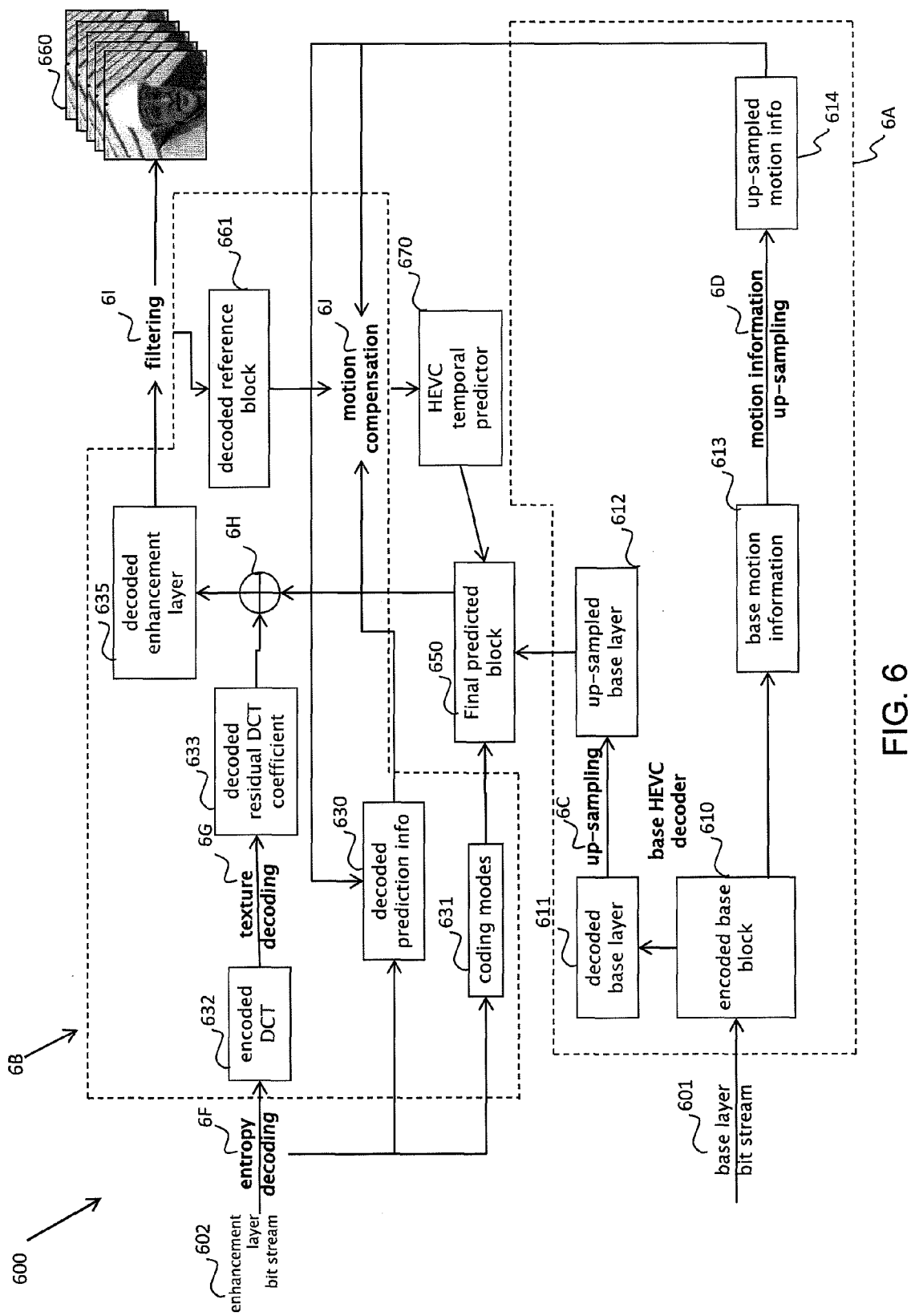
FIG. 6 is a block diagram illustrating the modules of a scalable decoder in accordance with an embodiment of the invention.

FIG. 6 is a block diagram of the architecture of a scalable video decoder 160 in which one or more embodiments of the invention can be implemented. The decoder architecture performs the reciprocal process of the encoding process of FIG. 4. The inputs to the decoder illustrated in FIG. 6 include:

an encoded base layer bit-stream 601, and
an encoded enhancement layer bit-stream 602.

The first stage of the decoding process corresponds to the decoding 6A of the base layer encoded base block 610. This decoding is then followed by the preparation of data useful for the inter-layer prediction of the enhancement layer 6B. The data extracted from the base layer decoding step includes two types:

a decoded base image 611 which undergoes a spatial up-sampling step 6C, in order to form the "Intra BL" prediction image 612. The up-sampling process 6C used here is identical to that of the encoder (FIG. 4);
the prediction information contained in the base layer (base motion information 613) is extracted and re-sampled 6D towards the spatial resolution of the enhancement layer. The prediction information up-sampling process is the same as that used on the encoder side.

When an INTER mode is used for the current CU in the base layer, the residual data of the base layer is also decoded in step 611 and up-sampled in step 612 to provide the final predictive CU in step 650.

Next, the processing of the enhancement layer 6B is performed as illustrated in the upper part of FIG. 6. This begins with the entropy decoding 6F of the prediction information contained in the enhancement layer bit-stream to provide decoded prediction information 630. This, in particular, provides the coding unit organization of the enhancement image, as well as the partitioning into prediction units, and the prediction mode (coding modes 631) associated with each prediction unit. In particular, the prediction information decoded in the enhancement layer may involve some refinement of the prediction information issued from the up-sampling step 614. In such a case, the reconstruction of the prediction information 630 in the enhancement layer makes use of the up-sampled base layer prediction information 614.

Once the prediction mode of each prediction unit of the enhancement image is obtained, the decoder 600 is able to construct the successive prediction blocks 650 that were used in the encoding of current enhancement image. The next decoder steps then involve decoding 6G the texture data (encoded DCT coefficients 632) associated with the current enhancement image. This texture decoding process follows the reverse process regarding the encoding method in FIG. 4 and produces decoded residual 633.

Once the residual block 633 has been obtained from the texture decoding process, it is added 6H to the prediction block 650 previously constructed. This, process applied to each enhancement image's block, leads to the decoded current enhancement image 635 which, optionally, undergoes some in-loop post-filtering process 6I. Such processing may comprise a HEVC deblocking filter, Sample Adaptive Offset (specified by HEVC) and/or Adaptive Loop Filtering (also specified by the HEVC standard), for example.

The decoded image 660 is ready for display and the individual frames can each be stored as a decoded reference block 661, which may be useful for motion compensation 6J in association with the HEVC temporal predictor 670, as applied for subsequent frames.

FIG. 7 depicts the prediction information up-sampling process (step 6C in FIG. 6 for instance). The prediction information up-sampling step is a useful mean to perform inter-layer prediction. FIG. 7A, 710, illustrates a part of the base layer image. In particular, the Coding Unit representation that has been used to encode the base image is illustrated, for the two first LCUs (Largest Coding Unit) of the image 711 and 712. The LCUs have a height and width, represented by arrows 713 and 714, respectively, and an identification number 715, here shown running from zero to two. The Coding Unit quad-tree representation of the second LCU 712 is illustrated, as well as prediction unit (PU) partitions e.g. partition 716. Moreover, the motion vector associated to each prediction unit, e.g. vector 717 associated with prediction unit 716, is showed.

FIG. 7B schematically illustrates the organization of LCUs, coding units and prediction units in the enhancement layer 750 that correspond to the base layer organization 710. Hence the result of the prediction information up-sampling process can be seen. In this Figure, the LCU size (height and width indicated by arrows 751 and 752, respectively) is the same as in the enhancement image and in the base image, i.e.

the base image LCU has been magnified. As can be seen, the up-sampled version of base LCU 712 results in the enhancement LCUs 2, 3, 6 and 7 (references 753, 754, 755 and 756, respectively). The individual prediction units exist in a scaling relationship known as a quad-tree. It can be noted that the coding unit quad-tree structure of coding unit 712 has been re-sampled in 750 as a function of the scaling ratio (here the value is 2) that exists between the enhancement image and the base image. The prediction unit partitioning is of the same type (i.e. the corresponding prediction units have the same shape) in the enhancement layer and in the base layer. Finally, motion vector coordinates e.g. 757 have been re-scaled as a function of the spatial ratio between the two layers.

In other words, three main steps are involved in the prediction information up-sampling process:
- the coding unit quad-tree representation is first up-sampled. To do so, a depth parameter of the base coding unit is decreased by one in the enhancement layer.
- the coding unit partitioning mode is kept the same in the enhancement layer, compared to the base layer. This leads to prediction units with an upscaled size in the enhancement layer,
- the motion vector is re-sampled to the enhancement layer resolution, simply by multiplying associated x and y coordinates by the appropriate scaling ratio (here ratio is 2).

As a result of the prediction information up-sampling process, some prediction information is available at the encoder and at the decoder side, and can be used in various inter-layer prediction mechanisms in the enhancement layer.

In the current scalable encoder and decoder architectures, this upscaled prediction information is used for the inter-layer prediction of motion vectors in the coding of the enhancement image. Therefore one additional predictor is used compared to HEVC, in the predictive coding of motion vectors.

Figure 8A:
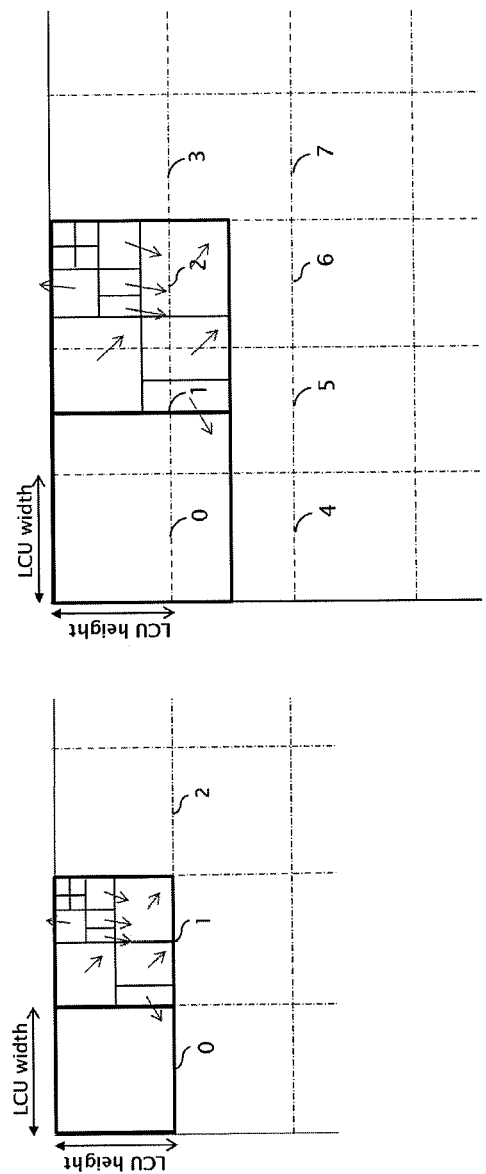
FIGS. 8A and 8B schematically illustrate coding units of a base layer and an enhancement layer for a spatial up-sampling ratio of 1.5

A similar process could be applied when the spatial ratio is equal to 2.0. However, in the case of spatial scalability with a ratio 1.5, the block-to-block correspondence between the base image and the enhancement image highly differs from the dyadic case. An example is illustrated in FIG. 8A for better understanding. On the left side, this is a representation of the base layer where two CTBs (or LCU) are split into a set of CUs. On the right side, this is a representation of the enhancement layer where CTBs are represented by dashed lines.

Therefore, a straight-forward prediction information up-scaling method as that illustrated by FIGS. 7A and 7B does not seem feasible in the case of ratio 1.5, because it would make it very complicated to determine the right CU splitting in for each CTB (or LCU) in the enhancement image represented by the dashed line in the right part of the above illustration.

Figure 8B:
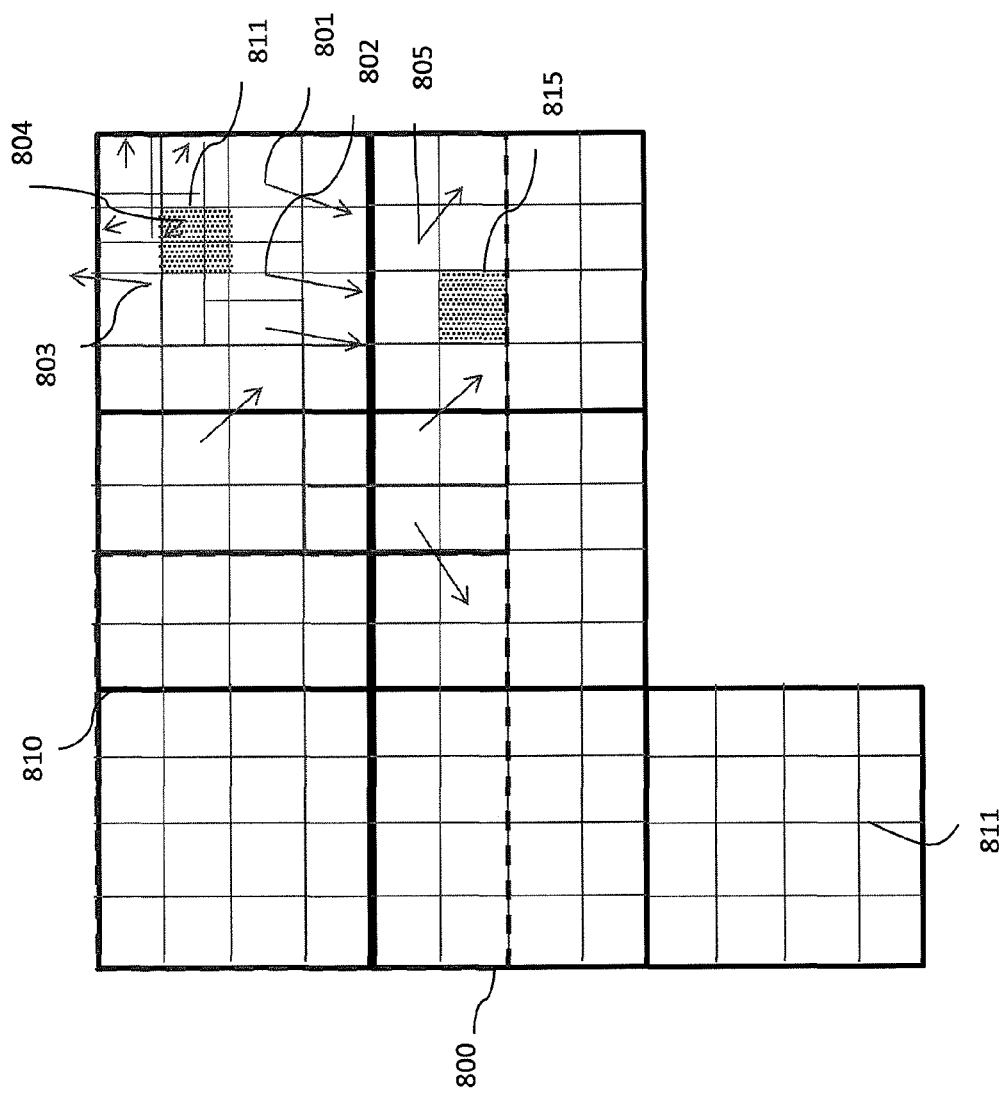
Figure 9:
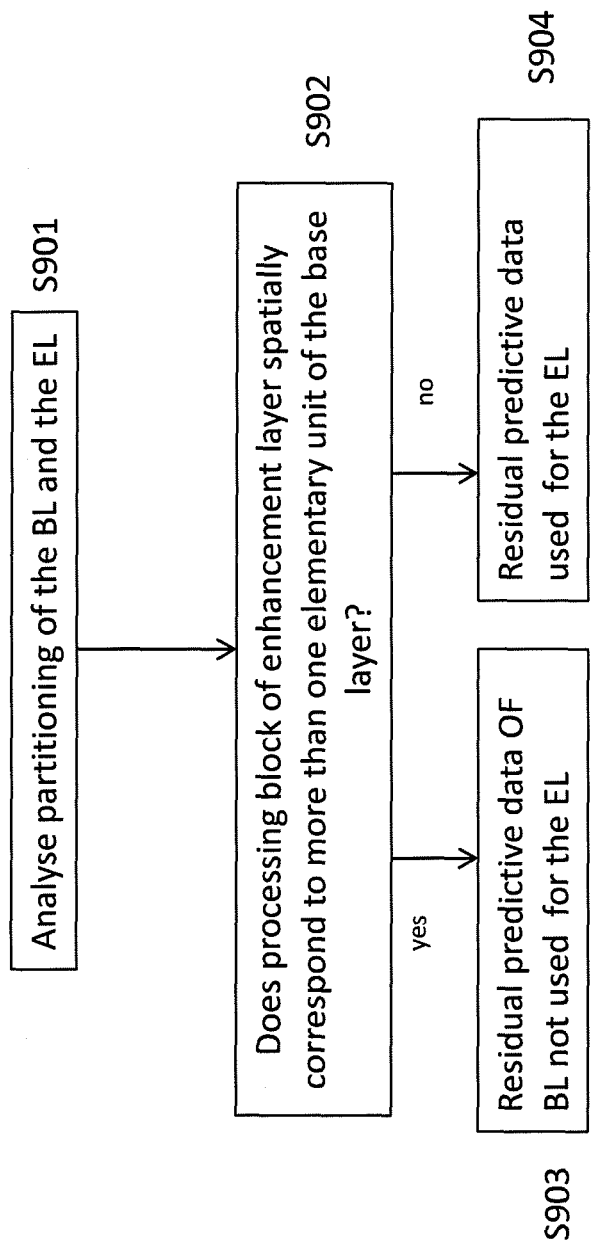
FIG. 9 is a flow chart illustrating steps of a method of determining residual data for an enhancement layer in accordance with a first embodiment of the invention.

FIG. 8B schematically illustrates an example of a process for simplifying motion information inheritance by performing a remapping of the existing motion information in the base layer. Base layer elements are represented in by dashed lines and are represented by "80_" labels. They are scaled at the enhancement layer resolution to better illustrate the spatial relationship between the structure of the enhancement layer and the base layer. The enhancement layer is represented in black on the image and labels start with "81_".

The interlayer derivation process involves splitting each CTB (810) in the enhancement image into CUs with minimum size (4×4 or 8×8). Then, each CU is associated with a single Prediction Unit (811) of type 2N×2N. Finally, the prediction information of each Prediction Unit is computed as a function of prediction information associated with the co-located area in the base image.

The prediction information derived from the base image includes the following information from the base layer. Typically for a CU represented by the block (811) in FIG. 8B, the following information is derived from the PU (801) of the base layer.
- Prediction mode,
- Merge information,
- Intra prediction direction (if relevant),
- Inter direction,
- Cbf values,
- Partitioning information,
- CU size,
- Motion vector prediction information,
- Reference image indices
- QP value (used afterwards if a deblocking onto the Base Mode prediction image)
- Motion vector values (note the motion field is inherited before the motion compression that takes place in the base layer and are scaled by 1.5).

It is important to note that for the current example, the derivation is performed with the CU of the base layer which corresponds to the bottom right pixel of the centre of the current CU (812). It will be appreciated that another position (for example top left CU) could be done to select the above inter layer information.

According to this process, each CTB (810) of the enhancement image is organized in a regular CU splitting according to the corresponding CTB in the base image (800) which was represented by a quad-tree structure.

It may be noted that, the derivation process for the inter layer prediction in the case of spatial ratio of 1.5, for example, may be problematic. In particular, for CU 811 the motion vector associated with this CU is derived from the underlying PU block 801 of the base layer. From FIG. 8B, it may be seen that the CU 811 of the enhancement layer spatially corresponds to 4 PUs of the base layer: 801, 802, 803 and 804. i.e. the region of the base layer spatially corresponding to CU 801 contains at least a part of PUs 801, 802, 803 and 804. If the 4 PUs contain motion vectors which are significantly different with respect to one another, the interlayer motion prediction may lead to a poor prediction.

In a specific example, interlayer prediction in accordance with one or more embodiments of the invention can also include the prediction of the residual data contained in the base layer. This means that the CU 811 may inherit residual data from PU 801s to 804 which correspond to a residual computed with the motion vector of the corresponding CU in the base layer. If a different motion vector is used for the enhancement layer, for example, the motion vector corresponding to the CU 801 is significantly different from any of the motion vectors of PUs, 802, 803 and 804, the residual data of corresponding base layer CUs 802, 803 and 804 has no meaning for the enhancement layer and will likely lead to artifacts in the resulting image.

Embodiments of the invention set out to address this residual data problem. More specifically the intent is to remove the visual artifacts that would appear for the predictive block due to the possible non-matching of the motion vector derivation based on the principle. Some embodiments of the invention are devised to correct the residual data used for creating the predictive CU of the enhancement layer. Some of the embodiments of the invention address, in particular coding modes such as the Base modes where the residual data of the base layer is used for the prediction of the enhancement layer. Such methods can be easily extended to other prediction modes for scalable video codec in which residual base layer data is used for the prediction of the enhancement layer.

As mentioned embodiments of the invention set out to correct the residual prediction block (or image) as much as possible in an attempt to avoid the visible artifacts on the predictive block/CU induced by the possible motion vector mismatch between the base layer motion field and the enhancement motion field. In a general embodiment the method includes determining based on at least the number of elementary units PUs of the base layer spatially corresponding, at least partially, to the processing block (CU), whether or not to use residual data of one or more of said spatially corresponding PUs of the base layer for prediction of the CU of the enhancement layer. Exemplary embodiments will now be described with reference to FIGS. 9 to 15.

FIGS. 9 to 15 are flow charts, each illustrating steps of a method of determining residual data for encoding or decoding at least part of an image of an enhancement layer of video data, in accordance with an embodiment of the invention. The video data includes enhancement layer composed of processing blocks (CUs) and a base layer composed of elementary units (PUs) each having associated residual data. The base layer may be of a lower spatial and/or temporal resolution compared to the enhancement layer being and the base layer being, the method comprising for a processing block of the enhancement layer With reference to FIG. 9, a method of determining residual data for encoding or decoding at least part of an image of an enhancement layer of video data, in accordance with a first embodiment of the invention includes an initial step S901 of comparing the partitioning of the base layer into the elementary units (base layer CUs) with the partitioning of the enhancement layer into processing blocks (enhancement layer CUs) in order to determine, for a CU of the enhancement layer, the number of CUs of the base layer spatially corresponding, at least partially, to that CU of the enhancement layer. In step S902 it is determined, whether or not, more than one CUs of the base layer corresponds to the current CU of the enhancement layer. If yes, for example in the case of CU 801 of the enhancement layer in FIG. 8B which spatially overlaps CUs 801, 802, 803 and 804 of the base layer, it is determined in step S903 that residual data of the base layer will not be considered for use in the prediction of the CU of the enhancement layer. Otherwise if it is determined that the current CU, for example CU 815 of FIG. 8B, spatially corresponds to only one CU of the base layer, i.e. the region of the base layer spatially corresponding to the current CU of the enhancement layer is fully contained within one CU of the base layer, then the residual predictive layer of that CU of the base layer is considered for prediction of the current CU of the enhancement layer in step S904.

Thus in the first embodiment the residual predictive data of the base layer is not used for processing blocks of the enhancement layer such as coding unit CU 811 that can be predicted by using several base layer CUs. However, for processing blocks of the enhancement layer such as CU 815, which can be entirely predicted by the underlying single base layer CU 805, the residual data of the base layer, i.e. the residual data associated with CU 805 in this example, is considered for the prediction of the enhancement layer CU 815. This implicit rule can be easily determined at the decoder side by comparing the CU partitioning in the base layer and the enhancement layer to identify which CU of the base layer spatially corresponds to more than one CU of the enhancement layer by projecting the partitioning at the same resolution of the enhancement layer. Consequently, there would be no need to signal anything in the bitstream.

Figure 10:
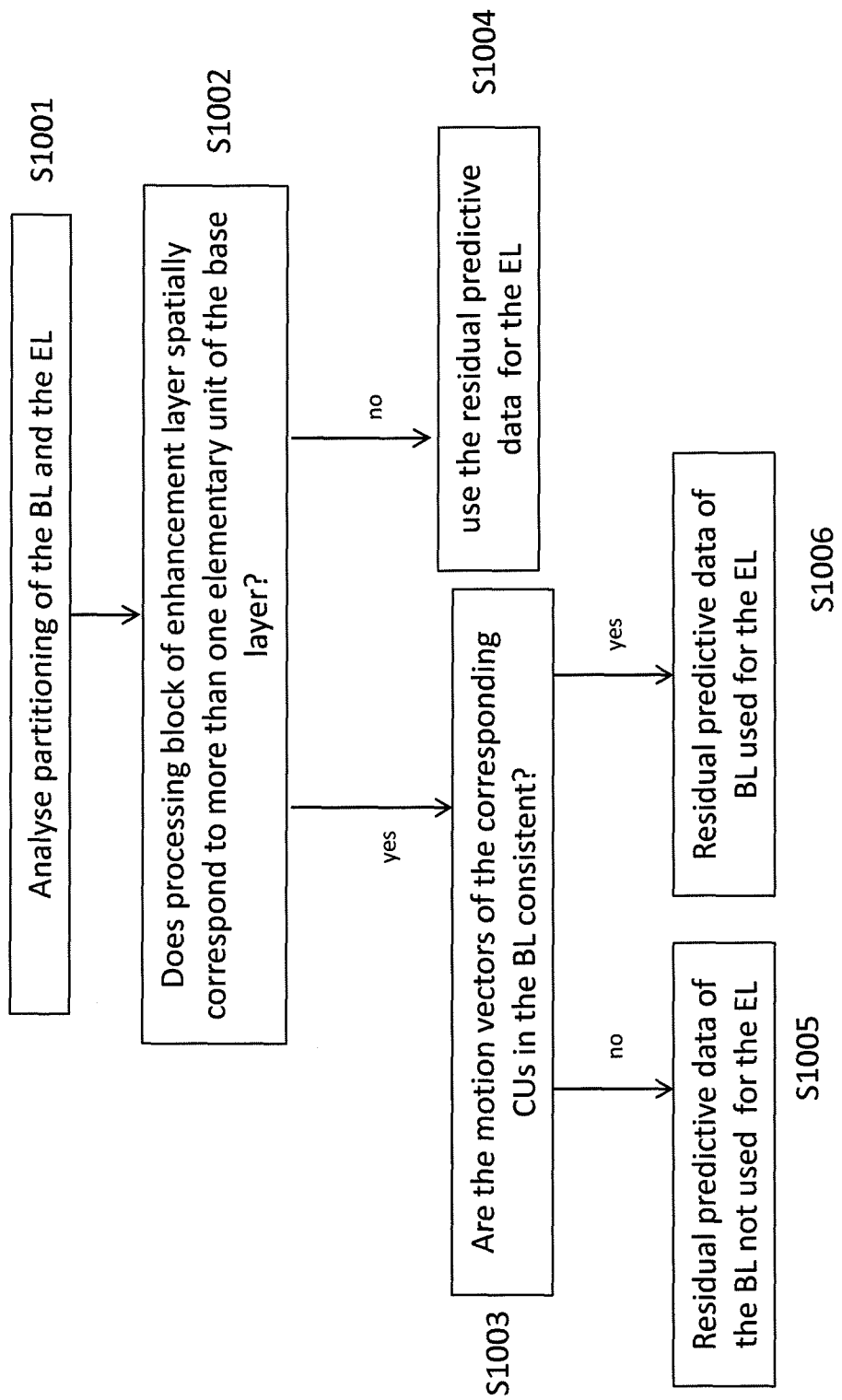
FIG. 10 is a flow chart illustrating steps of a method of determining residual data for an enhancement layer in accordance with a second embodiment of the invention.

With reference to FIG. 10, a method of determining residual data for encoding or decoding at least part of an image of an enhancement layer of video data, in accordance with a second embodiment of the invention includes an initial step S1001 of comparing the partitioning of the base layer into the elementary units (base layer CUs) with the partitioning of the enhancement layer into processing blocks (enhancement layer CUs) in order to determine, for a CU of the enhancement layer, the number of CUs of the base layer spatially corresponding, at least partially, to that CU of the enhancement layer.

In step S1002 it is determined, whether or not, more than one CUs of the base layer corresponds to the current CU of the enhancement layer. If yes, for example in the case of CU 801 of the enhancement layer in FIG. 8B which spatially overlaps CUs 801, 802, 803 and 804 of the base layer, it is further determined in step S1003 whether or not the motion vectors of the CUs of the base layer spatially corresponding to the current enhancement layer CU are consistent with one another.

For example in FIG. 8B it may be considered that the motion vector of CU 801 is quite similar to and thus consistent with the motion vector of CU 802 since the both point in the general same direction. This means that the residual data of the shaded area of the intersection of CU 801 and CU 802 could be used for residual prediction of the current coding unit 811 of the enhancement layer. On the contrary, motion vectors of CU 803 and 804 are considered to be different from one another, since they point in different directions to one another. Consequently they are not considered for use in the prediction of the current coding unit of the enhancement layer.

Determining whether or not the motion vectors of base layer CUs are consistent with one another may be performed in different ways:

a. For example, if after derivation, the motion vector of an underlying predictive CU of the base layer is of opposite direction to the others underlying CU in the base layer the residual data of that CU will not be considered for predicting the current CU of the enhancement layer, S1006. Otherwise if the motion vector of an underlying predictive CU of the base layer is of the same direction as the others underlying CU in the base layer the residual data of that CU is considered for predicting the current CU of the enhancement layer, S1005 b. As a further example, an angular tolerance could be checked to add the corresponding residual. For example a 5% angular tolerance could be considered as acceptable to maintain the residual data for the prediction. Thus if the motion vectors of the underlying CUs fall within an angular range defined by that tolerance the residual data may be used in the prediction of the enhancement layer CU. S1006. Otherwise the residual data is not used—step S1005.

c. In another example the motion vector is of the same direction but is significantly different in magnitude, the residual data will not be considered for prediction of the current coding unit if the enhancement layer S1006. For example a tolerance of 10% in magnitude could be acceptable for using the residual data of the underlying CUs in the base layer. Such tolerance thresholds can be fixed (and known at both encoder and decoder sides) or transmitted into the bitstream to apply the same prediction process at the encoder and decoder sides. It will be appreciated that in some embodiments of the invention the consistency between motion vectors may be defined by both an angular and a magnitude tolerance Otherwise, if it is determined, in step S1002 that the current CU, for example CU 815 of FIG. 8B, spatially corresponds to only one CU of the base layer, i.e. the region of the base layer spatially corresponding to the current CU of the enhancement layer is fully contained within one CU of the base layer, then the residual predictive layer of that CU of the base layer is considered for prediction of the current CU of the enhancement layer in step 1004.

Thus in the second embodiment the residual data for a plurality of inter-layer predictive CUs is added only if the motion vectors of the spatially coding units of the base layer, spatially corresponding to the current coding of the enhancement layer, are consistent with one another.

Figure 11:
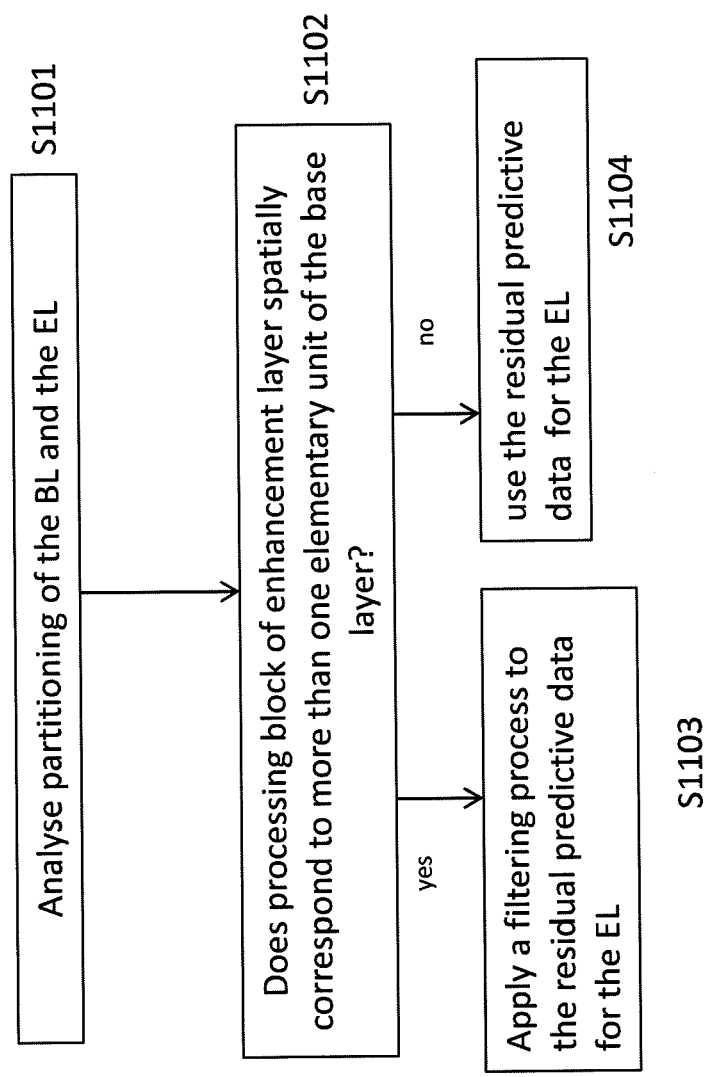
FIG. 11 is a flow chart illustrating steps of a method of determining residual data for an enhancement layer in accordance with a third embodiment of the invention.

With reference to FIG. 11, a method of determining residual data for encoding or decoding at least part of an image of an enhancement layer of video data, in accordance with a third embodiment of the invention includes an initial step S1101 of comparing the partitioning of the base layer into the elementary units (base layer CUs) with the partitioning of the enhancement layer into processing blocks (enhancement layer CUs) in order to determine, for a CU of the enhancement layer, the number of CUs of the base layer spatially corresponding, at least partially, to that CU of the enhancement layer.

In step S1102 it is determined, whether or not, more than one CUs of the base layer corresponds to the current CU of the enhancement layer. If yes, for example in the case of CU 801 of the enhancement layer in FIG. 8B which spatially overlaps CUs 801, 802, 803 and 804 of the base layer, a filtering process is applied in step S1103 to the residual data of the spatially overlapped CUs.

For example in order to avoid visual artifacts that could be generated due to the application of residual data of the base layer in the prediction process, a filter is applied to the predictive residual signal on the inner CU borders between two adjacent spatially overlapped CUs the base later in the case where the residual data comes from several underlying base layer CUs. The filtering process is applied for example on the inner frontiers of the reconstructed interlayer predictive CU 811. The filtering process may be, for example, a filtering process such as a deblocking filter or any other filtering process that will smooth the artifacts introduced by the addition of the base layer residual of the CU for prediction of the current enhancement layer CU.

Figure 12:
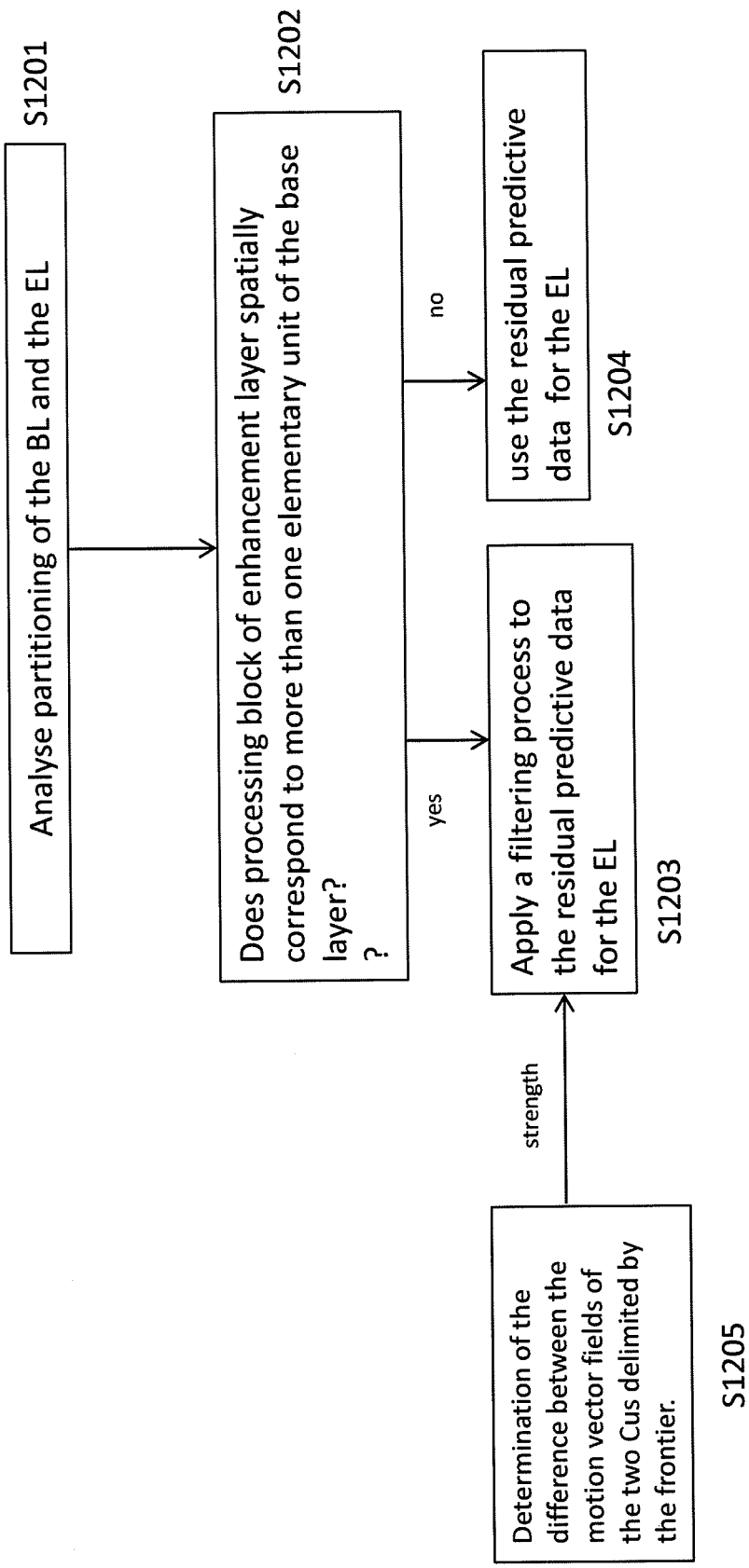
FIG. 12 is a flow chart illustrating steps of a method of determining residual data for an enhancement layer in accordance with a fourth embodiment of the invention.

In step S1104 no filtering process is applied when the CU of the enhancement layer corresponds to only one CU of the base layer as determined in step S1102, i.e. the CU of the enhancement layer is completely included in an underlying CU of the base layer. This is the case for CU 815 of FIG. 8B which does not need any correction since the motion vector of the base layer CU (805) is homogeneous within the CU of the base layer. With reference to FIG. 12, a method of determining residual data for encoding or decoding at least part of an image of an enhancement layer of video data, in accordance with a fourth embodiment of the invention includes an initial step S1101 of comparing the partitioning of the base layer into the elementary units (base layer CUs) with the partitioning of the enhancement layer into processing blocks (enhancement layer CUs) in order to determine, for a CU of the enhancement layer, the number of CUs of the base layer spatially corresponding, at least partially, to that CU of the enhancement layer.

In step S1202 it is determined, whether or not, more than one CUs of the base layer corresponds to the current CU of the enhancement layer. If yes, for example in the case of CU 801 of the enhancement layer in FIG. 8B which spatially overlaps CUs 801, 802, 803 and 804 of the base layer, a filtering process is applied in step S1203 to the residual data of the spatially overlapped CUs.

The filtering process may for example be a deblocking filter. The filtering strength of the deblocking filter, as determined in step S1205, depends on the difference between the motion vector fields of the two adjacent CUs of the base layer delimited by the borders. The strength of the filter is greater, the greater the difference between the motion vectors. The differences between motion vectors are computed from the angular difference of the motion vectors and/or from the motion vector magnitude difference, for example.

In step S1204 no filtering process is applied when the CU of the enhancement layer corresponds to only one CU of the base layer as determined in step S1202, i.e. the CU of the enhancement layer is completely included in an underlying CU of the base layer. This is the case for CU 815 of FIG. 8B which does not need any correction since the motion vector of the base layer CU (805) is homogeneous within the CU of the base layer.

Figure 13:
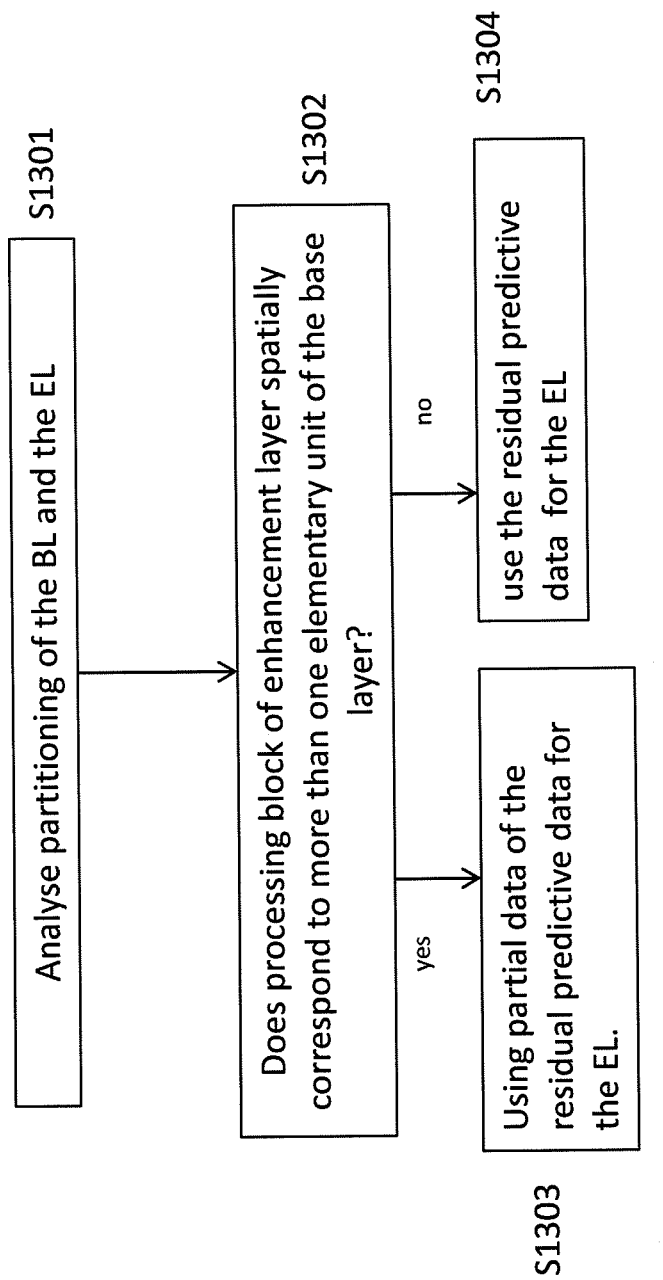
FIG. 13 is a flow chart illustrating steps of a method of determining residual data for an enhancement layer in accordance with a fifth embodiment of the invention.

With reference to FIG. 13, a method of determining residual data for encoding or decoding at least part of an image of an enhancement layer of video data, in accordance with a fifth embodiment of the invention includes an initial step S1301 of comparing the partitioning of the base layer into the elementary units (base layer CUs) with the partitioning of the enhancement layer into processing blocks (enhancement layer CUs) in order to determine, for a CU of the enhancement layer, the number of CUs of the base layer spatially corresponding, at least partially, to that CU of the enhancement layer. The partial data can, for example, correspond to the reconstruction of the low-frequency component of the inverse DCT such that residual data from edges is not taken into account. In a more restrictive approach, only the DC coefficients of the residual data are used for prediction.

In step S1302 it is determined, whether or not, more than one CUs of the base layer corresponds to the current CU of the enhancement layer. If yes, for example in the case of CU 801 of the enhancement layer in FIG. 8B which spatially overlaps CUs 801, 802, 803 and 804 of the base layer in step S1303 partial data of the residual predictive data of the CUs of the base layer spatially corresponding to the current CU of the enhancement layer is applied for prediction of the current CU of the enhancement layer.

If in step S1302 it is determined that the current CU, for example CU 815 of FIG. 8B, spatially corresponds to only one CU of the base layer, i.e. the region of the base layer spatially corresponding to the current CU of the enhancement layer is fully contained within one CU of the base layer, then the residual predictive layer of that CU of the base layer is considered for prediction of the current CU of the enhancement layer in step S1304.

Figure 14:
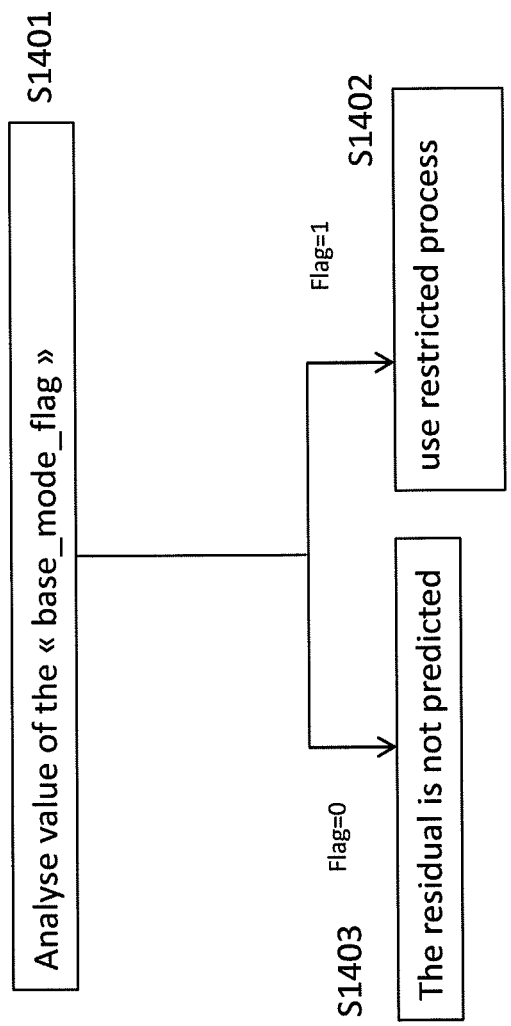
FIG. 14 is a flow chart illustrating steps of a method of determining residual data for an enhancement layer in accordance with a sixth embodiment of the invention.

With reference to FIG. 14, a method of determining residual data for encoding or decoding at least part of an image of an enhancement layer of video data, in accordance with a sixth embodiment of the invention includes an initial step S1401 of analysing the value of a base_mode_flag in order to determine, whether or not to use residual data of one or more of said spatially corresponding elementary units of the base layer for prediction of the processing block.

In the sixth embodiment, the residual data is signaled in an independent way similarly to a H264/SVC case. In H264/SVC, the "base_mode_flag" when equal to 1 specifies that the current macroblock partitioning, the macroblock (partition) prediction mode(s) and the corresponding motion data (when available) are inferred from the corresponding macroblock in the base layer. In addition, the "residual_prediction_flag" when equal to 1 specifies that the residual signal of the current macroblock is predicted by using under the predefined conditions of the first to fifth embodiments of the invention S1402 The residual is not predicted when this flag is equal to 0—step S1403. More specifically, this consists in separating the Base mode into two components where the second component corresponds to the predictive residual data. For this particular embodiment where the residual data is signaled in an independent way, exactly the same processing for the residual data of the coding units of the base layer spatially corresponding to the current coding unit of the enhancement layer may be used as described in any of the previous embodiments (e.g. not using the residual data, filtering the residual data, using partial residual data) where the predictive motion information and the predictive residual data are coded through a single syntax element.

Figure 15:
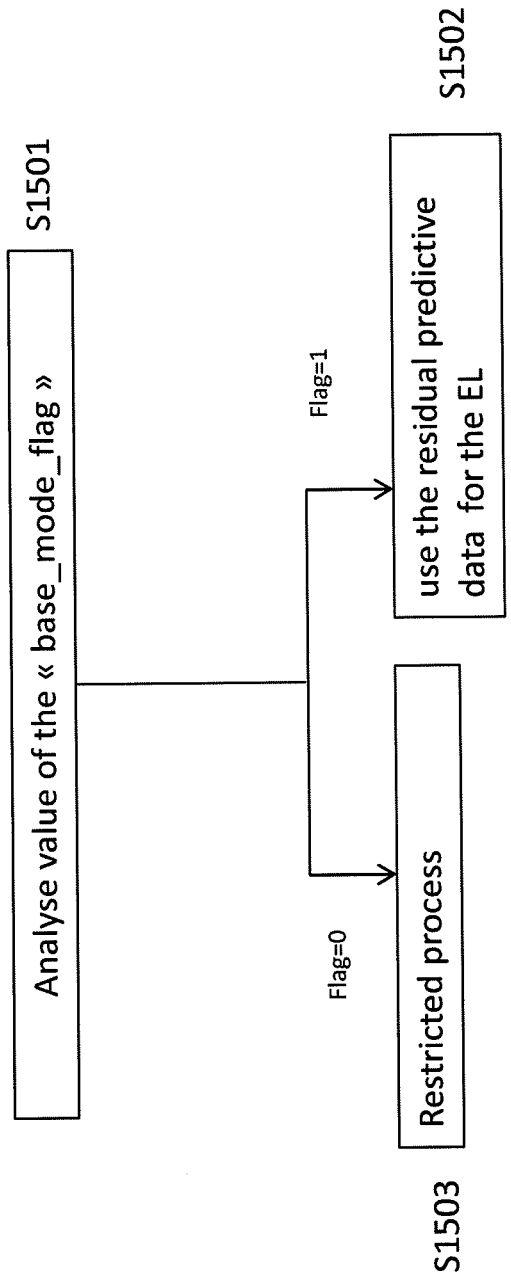
FIG. 15 is a flow chart illustrating steps of a method of determining residual data for an enhancement layer in accordance with a seventh embodiment of the invention.

With reference to FIG. 15, a method of determining residual data for encoding or decoding at least part of an image of an enhancement layer of video data, in accordance with a seventh embodiment of the invention includes an initial step S1501 of analysing the value of a base_mode_flag in order to determine, whether or not to use residual data of one or more of said spatially corresponding elementary units of the base layer for prediction of the processing block.

In the seventh embodiment, the meaning of the associated flag is changed. More precisely, when the syntax element "residual_prediction_flag" is set to 1, in step S1502 the residual predictive data of all underlying spatially corresponding base layer CUs are always added to create the predictive CU. However, when this flag is set to 0, in step S1503 a restrictive process for creating the enhancement layer CU is performed and the residual data of the underlying base layer CU is added under predefined conditions of any one of the first to sixth embodiments of the invention.

Although the present invention has been described hereinabove with reference to specific embodiments, the present invention is not limited to the specific embodiments, and modifications will be apparent to a skilled person in the art which lie within the scope of the present invention.

For instance, while in the foregoing examples, the scaling ration is 1.5, it will be appreciated that the invention may be applied to other scaling ratios.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of determining residual data for encoding or decoding at least part of an image of an enhancement layer of video data, the video data including the enhancement layer and a base layer, the enhancement layer being composed of processing blocks and the base layer being composed of elementary units each having associated residual data, the method comprising:
for a processing block of the enhancement layer, determining, based on at least the number of elementary units of the base layer spatially corresponding, at least partially, to the processing block, whether or not to use residual data of one or more of said spatially corresponding elementary units of the base layer for prediction of the processing block,
wherein in the case where only one elementary unit spatially corresponds to the processing block, the residual data associated with the said one elementary unit is used for prediction of the corresponding processing block of the enhancement layer;
otherwise, in the case where a plurality of elementary units spatially correspond at least partially to the processing block,
either:
1) the residual data of none of the said plurality of elementary units is used for prediction of the corresponding processing block of the enhancement layer; or
2) the residual data of at least one of the plurality of elementary units is used, under a predefined condition, for prediction of the corresponding processing block of the enhancement layer,
wherein the predefined condition defines that the motion vectors of the plurality of elementary units are consistent with one another.

2. The method according to claim 1 wherein the motion vectors of the plurality of elementary units are considered to be consistent with one another if the direction of each of the motion vectors fall within a predetermined angular tolerance.

3. The method according to claim 1 wherein the motion vectors of the plurality of elementary units are considered to be consistent with one another if the magnitude of each of the motion vectors falls within a predetermined range of magnitudes.

4. The method according to claim 2 wherein data representative of the tolerance is transmitted in the bitstream.

5. The method according to claim 1 wherein, the predefined condition is the application of a filtering process to the residual data of the plurality of elementary units.

6. The method according to claim 5 wherein the filtering process is applied to the residual data at the inner borders between the plurality of elementary units.

7. The method according to claim 6 wherein the filtering process comprises application of a deblocking filter.

8. The method according to claim 6 wherein the filtering strength of the filtering process is determined in dependence upon the difference between the motion vectors of the two elementary units delimited by the respective inner border.

9. The method according to claim 8 wherein the filtering strength is dependent on the difference in at least one of the angular directions and the magnitudes of the motion vectors.

10. The method according to claim 1 wherein the predefined condition is the application of only partial residual data for prediction of the processing block.

11. The method according to claim 10 wherein the partial residual data corresponds to the reconstruction of the low frequency component of the inverse DCT such that the residual data from the edges is not taken into account.

12. The method according to claim 10 wherein only the DC coefficients of the residual data are used for prediction of the processing block.

13. The method according to claim 1 wherein the state of predetermined flag signalled in the bitstream is indicative of whether one or more elementary units spatially correspond to the processing block.

14. A device for determining residual data for encoding or decoding at least part of an image of an enhancement layer of video data, the video data including the enhancement layer and a base layer, the enhancement layer being composed of processing blocks and the base layer being composed of elementary units each having associated residual data, the device comprising:
  a residual data processor for determining, based on at least the number of elementary units of the base layer spatially corresponding, at least partially, to a processing block of the enhancement layer, whether or not to use residual data of one or more of said spatially corresponding elementary units of the base layer for prediction of the processing block,
  wherein the residual data processor is configured to determine
    in the case where only one elementary unit spatially corresponds to the processing block, the residual data associated with the said one elementary unit is to be used for prediction of the corresponding processing block of the enhancement layer;
    otherwise, in the case where a plurality of elementary units spatially correspond at least partially to the processing block,
    either:
      1) the residual data of none of the said plurality of elementary units is to be used for prediction of the corresponding processing block of the enhancement layer; or
      2) the residual data of at least one of the plurality of elementary units is to be used, under a predefined condition, for prediction of the corresponding processing block of the enhancement layer,
    wherein the predefined condition defines that the motion vectors of the plurality of elementary units are consistent with one another.

15. The device according to claim 14 wherein the residual data processor is configured to consider motion vectors of the plurality of elementary units to be consistent with one another if the direction of each of the motion vectors fall within a predetermined angular tolerance.

16. A non-transitory computer readable storage medium storing instructions of a computer program for implementing a method, according to claim 1.

* * * * *